US011952160B2

(12) United States Patent
Valceschini et al.

(10) Patent No.: US 11,952,160 B2
(45) Date of Patent: Apr. 9, 2024

(54) FLEXIBLE PRODUCTION OF COSMETICS IN FACTORY

(71) Applicant: L'OREAL, Paris (FR)

(72) Inventors: Florent Valceschini, Paris (FR); Richard Besen, New York, NY (US); Christopher Hipple, New York, NY (US); Fred Orsita, New York, NY (US)

(73) Assignee: L'OREAL, Paris (FR)

( * ) Notice: Subject to any disclaimer, the term of this patent is extended or adjusted under 35 U.S.C. 154(b) by 40 days.

(21) Appl. No.: 17/709,564

(22) Filed: Mar. 31, 2022

(65) Prior Publication Data

US 2022/0315262 A1 Oct. 6, 2022

Related U.S. Application Data

(60) Provisional application No. 63/168,722, filed on Mar. 31, 2021.

(30) Foreign Application Priority Data

Jun. 8, 2021 (FR) ........................................ 2105999

(51) Int. Cl.
B65B 43/52 (2006.01)
B65B 3/04 (2006.01)
(Continued)

(52) U.S. Cl.
CPC ............... B65B 57/04 (2013.01); B65B 3/04 (2013.01); B65B 43/46 (2013.01); B65B 43/52 (2013.01);
(Continued)

(58) Field of Classification Search
CPC ........... B65B 59/02; B65B 3/04; B65B 43/46; B65B 29/00; B65B 59/003; B65B 43/52;
(Continued)

(56) References Cited

U.S. PATENT DOCUMENTS 5,004,093 A * 4/1991 Blezard .................. B65B 43/46
177/52
2006/0124196 A1 6/2006 Bartholomew et al.
(Continued)

FOREIGN PATENT DOCUMENTS

WO WO 2006/052863 A1 5/2006
WO WO 2020/180799 A1 9/2020

OTHER PUBLICATIONS

France Preliminary Report on Patentability and Written Opinion dated Feb. 25, 2022, in FR2105999 (with English Translation of Category of Cited Documents), 14 pages.
(Continued)

Primary Examiner — Chinyere J Rushing-Tucker
(74) Attorney, Agent, or Firm — Oblon, McClelland, Maier & Neustadt, L.L.P.

(57) ABSTRACT

A system is provided for dispensing a cosmetic container, comprising: a conveyer belt configured to transport a receiver container along a fill line; a robotic arm disposed at an ingress position of the fill line; a sensor disposed at an egress position of the fill line; circuitry configured to receive an order having a container type; control the robotic arm to obtain a container corresponding to the container type and place it a predetermined position on the conveyor belt at an entrance of the fill line; transit information of a sequence position of the container and the container type to the sensor; verify that the correct container is at the sequence position at the egress of the fill line after the container has been filed with a cosmetic product.

4 Claims, 28 Drawing Sheets

(51) Int. Cl.
  *B65B 43/46* (2006.01)
  *B65B 57/04* (2006.01)
  *B25J 9/00* (2006.01)
(52) U.S. Cl.
  CPC ... *B25J 9/0093* (2013.01); *G05B 2219/39001* (2013.01)
(58) Field of Classification Search
  CPC ....... B65B 57/00; B65B 59/001; B65B 57/04; B65B 2220/14; B65B 2210/04; B25J 19/023; B25J 9/0093; G05B 2219/39001
  USPC .......................................................... 53/169
  See application file for complete search history.

(56) References Cited

U.S. PATENT DOCUMENTS

| | | | |
|---|---|---|---|
| 2010/0116843 | A1 | 5/2010 | Bartholomew et al. |
| 2012/0216911 | A1 | 8/2012 | Bartholomew et al. |
| 2014/0094964 | A1 | 4/2014 | Bartholomew et al. |
| 2015/0274333 | A1* | 10/2015 | Greyshock .............. G07F 9/001 414/800 |
| 2016/0026774 | A1* | 1/2016 | Joplin .................. B65G 1/1378 700/216 |
| 2017/0282139 | A1 | 10/2017 | Bartholomew et al. |
| 2018/0268641 | A1 | 9/2018 | Bartholomew et al. |
| 2020/0277181 | A1 | 9/2020 | Besen et al. |
| 2022/0147929 | A1* | 5/2022 | Bessette .................. B65B 43/59 |

OTHER PUBLICATIONS

Anonymous: "XTS combines the functionality of five machines in a single production line", PC-Control the New Automation Technology Magazine, Apr. 30, 2020, pp. 1-4, XP055891327, URL:https://www.pc-control.net/pdf/012020/ solutions/pcc_0120_loreal_e.pdf.
Vachalek Jan et al., "Intelligent Dynamic Identification Technique of Industrial Products in a Robotic Workplace", Sensors, [Online] vol. 21, No. 5, Mar. 5, 2021, pp. 1-20, XP055891318, DOI: 10.3390/521051797 URL:https://doi.org/10.3390/x21051797>.
Brandl M. et al.., "Position estimation of RFID-based sensors using SAW compressive receivers", Sensors and Actuators A: Physical, Elsevier BV, NL, vol. 244, Apr. 13, 2016, pp. 277-284, XP029538738, ISSN: 0924-4247, DOI: 10.1016/J.SNA.2016.04.032.

* cited by examiner

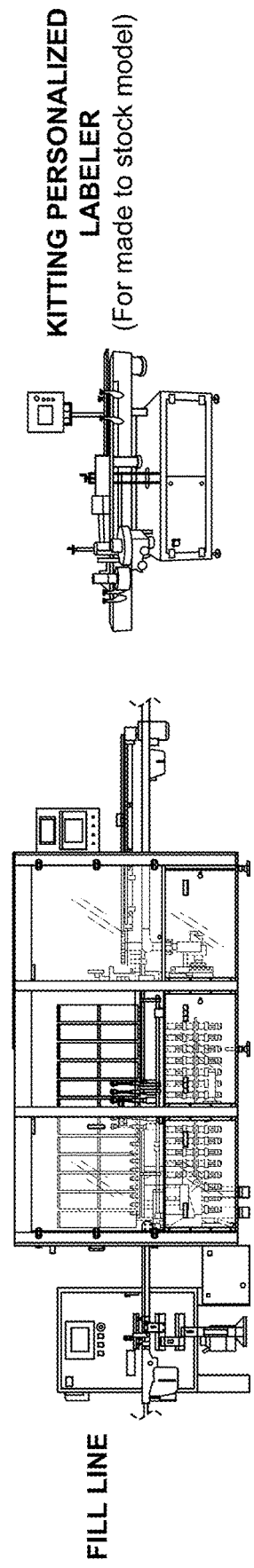
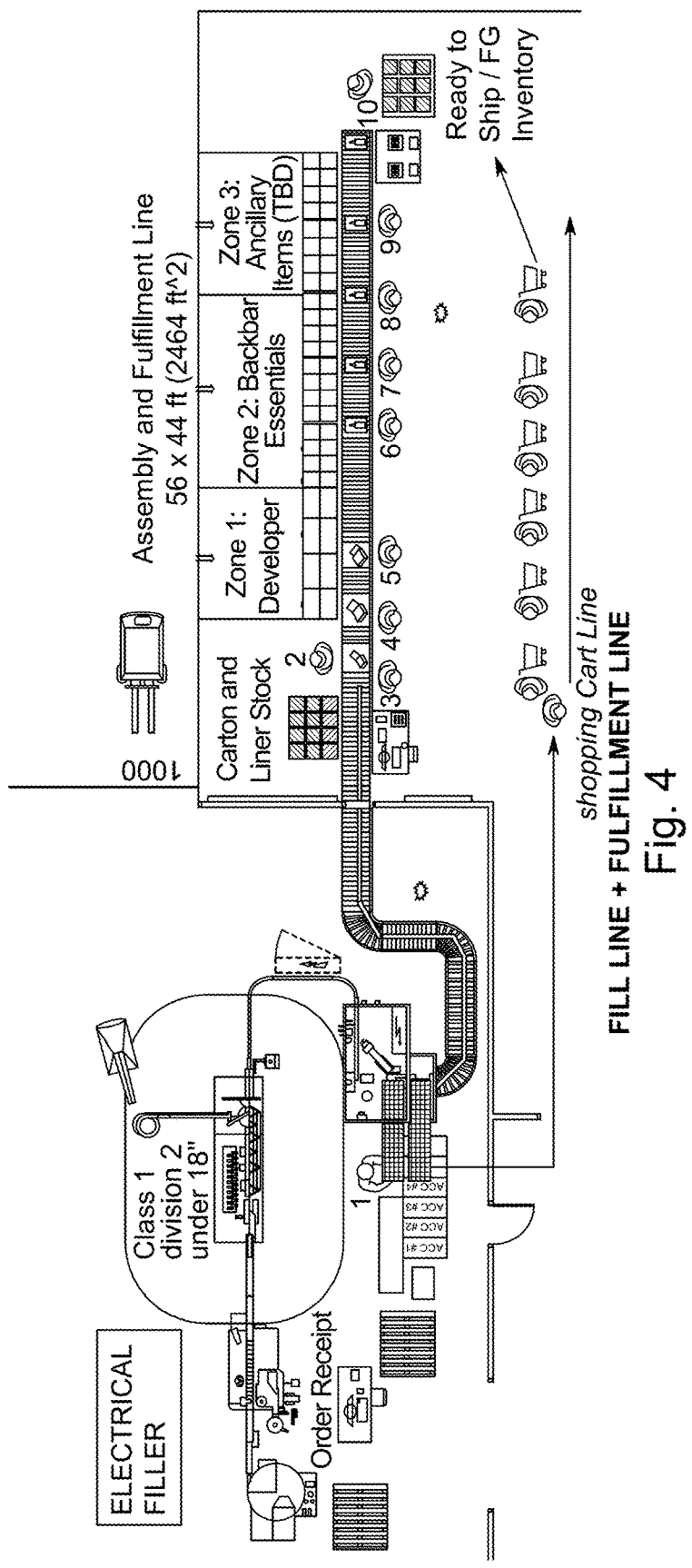
Fig. 4

PERSONALIZED FILL LINE

KEY STATISTICS:

- Fastest personalized manufacturing to date
- 100% traceability and full unit serialization
- In-line quality checks
- Highly automated (<1 Full Time Operator required)
- Highly adaptable to allow for new dye colors in future
- Directly linked to kitting line
- Internet connected per Industry 4.0 standards

MUCH - REGULAR USE IBC + CORRUGATE

MATERIALS TO FILL:
- Monochrome compounds (15-24 types)

SIZE:
- 10.6L capacity, target fill = ~10L

GENERAL CONSTRUCTION:
- The bulk containers consist of a bag + sealed valve assembly
- The bulk bags would be shipped inside a corrugate box with an opening for the valve

BAG CONSTRUCTION:
- Bag film: minimum 2-ply engineered materials
- Valve:
  - Valve is foil sealed and is adapted to work with a "probe" on the MUCH fill machine. Valve + probe form watertight/airtight seal

CORRUGATE:
- Standard corrugate material with handhold cutouts and cutout for bag spout
- Confirmed dimensions of roughly 7.25" x 8" x 11.5"

MARKING/LABELING:
- The inner bag as well as the corrugate should include a label that identifies the bag contents
- The outer label (on the corrugate) will contain human readable text (contents, expiration date, batch info) as well as a 2D barcode with the same information encoded

SHIPPING:
- Would plan to ship palletized

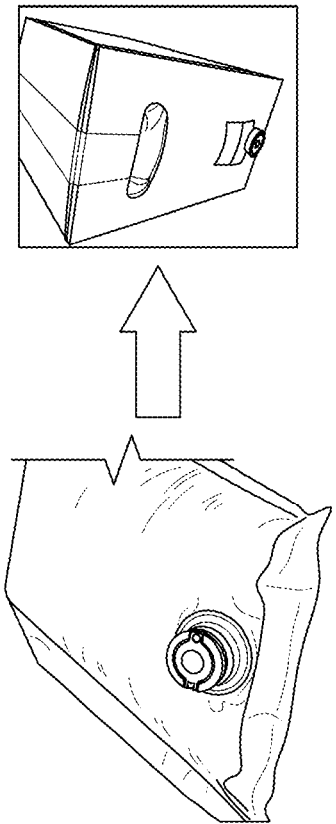

Fig. 11

MUCH – HEAVY USE IBC

MATERIALS TO FILL:
- Clear Base compounds

SIZE:
- 1325 L capacity, target fill = ~1000L

GENERAL CONSTRUCTION:
- Industrial tote lined with bag + Cap

LINER CONSTRUCTION:
- Bag film: minimum 3-ply engineered materials

MARKING/LABELING:
- Outer label (on the tote) will contain human readable text (contents, expiration date, batch info) as well as a 2D barcode with the same information encoded

SHIPPING:
- Would ship non-palletized
- To recycle, liner could be disposed, and tote shipped empty back for refill

Fig. 12

MUCH - IBC FILLING EQUIPMENT - PRODUCTION

- Fills the bag
- Caps the bag with foil sealed valve
- Has capability to flush with nitrogen or create vacuum

MUCH - DIRECT RM INGREDIENTS

MATERIALS:
- Ammonia
- 14B

SIZE:
- Ammonia: 200L drum
- 14B: 6L aluminum bottle

GENERAL CONSTUCTION:
- Industrial pre-DOT approved containers

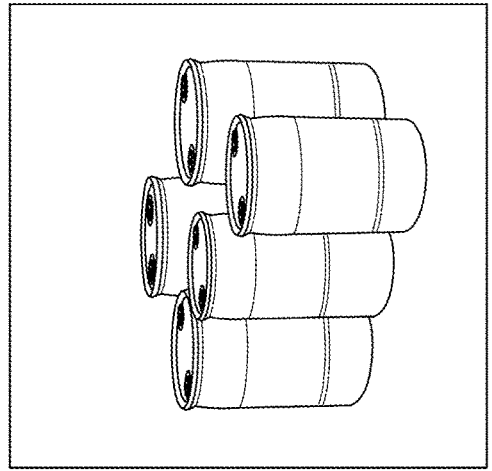

FILLING:
- At vendor

MARKING/LABELING:
- Outer label (on the tote) will contain human readable text (contents, expiration date, batch info) as well as a 2D barcode with the same information encoded

SHIPPING:
- Would ship non-palletized

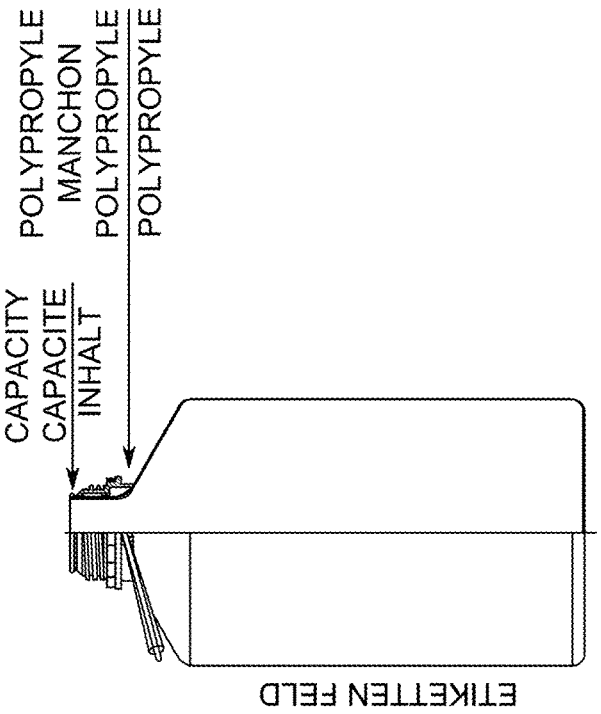

Fig. 14

FLEXIBLE PRODUCTION OF COSMETICS IN FACTORY

CROSS-REFERENCE TO RELATED APPLICATIONS

This application claims the benefit of priority to U.S. Provisional Application No. 63/168,722 filed Mar. 31, 2021 and French Application Serial No. 2105999 filed Jun. 8, 2021, the entire contents of each of which are incorporated herein by reference.

BACKGROUND

A conventional hair dye kit includes a combination of a dye and a developer, each of which may be packaged into a bottle for commercial sale. In the conventional art, a color formulation to be dispensed into dye bottle comes from a source factory, and more specifically from a large volume container.

There is a need to provide a larger variety of color formulations, and even customizable color formulations, to make available for customer purchase. However, the conventional system has a problem in that it is difficult to efficiently predict and make available such a large variety of hair dye formulations for dispensing into hair dye bottle with the existing system in which hair dye formulations are produced and dispensed using large volume containers.

Additionally, greater flexibility needs to be provided to allow optimization of the dispensing process and type of packaging that can be used based on the specific formula that needs to be dispensed on a bottle-by-bottle basis.

SUMMARY

In an embodiment, a system is provided for dispensing a cosmetic container, comprising: a conveyer belt configured to transport a receiver container along a fill line; a robotic arm disposed at an ingress position of the fill line; a sensor disposed at an egress position of the fill line; circuitry configured to receive an order having a container type; control the robotic arm to obtain a container corresponding to the container type and place it a predetermined position on the conveyor belt at an entrance of the fill line; transit information of a sequence position of the container and the container type to the sensor; verify that the correct container is at the sequence position at the egress of the fill line after the container has been filed with a cosmetic product.

In an embodiment, the sensor disposed at the egress position is a vision sensor.

In an embodiment, the container obtained by the robotic arm has an embedded radiofrequency tag that stores information regarding the container type, and the sensor disposed at the egress position is configured to read the stored information from the radiofrequency tag.

In an embodiment, the robotic arm has access to a plurality of container types.

In an embodiment, the plurality of container types correspond to different stock keeping units (SKUs).

In an embodiment, the plurality of container types include a glass bottle and a plastic bottle.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 4 shows an overview of the fill line and personalization process according to an embodiment.

FIG. 11 shows details of the "bag-in-box" type of IBC according to an embodiment.

FIG. 12 shows details of the heavy use IBC according to an embodiment.

FIG. 14 shows details related to the containers in an embodiment

DETAILED DESCRIPTION

Figure 1:
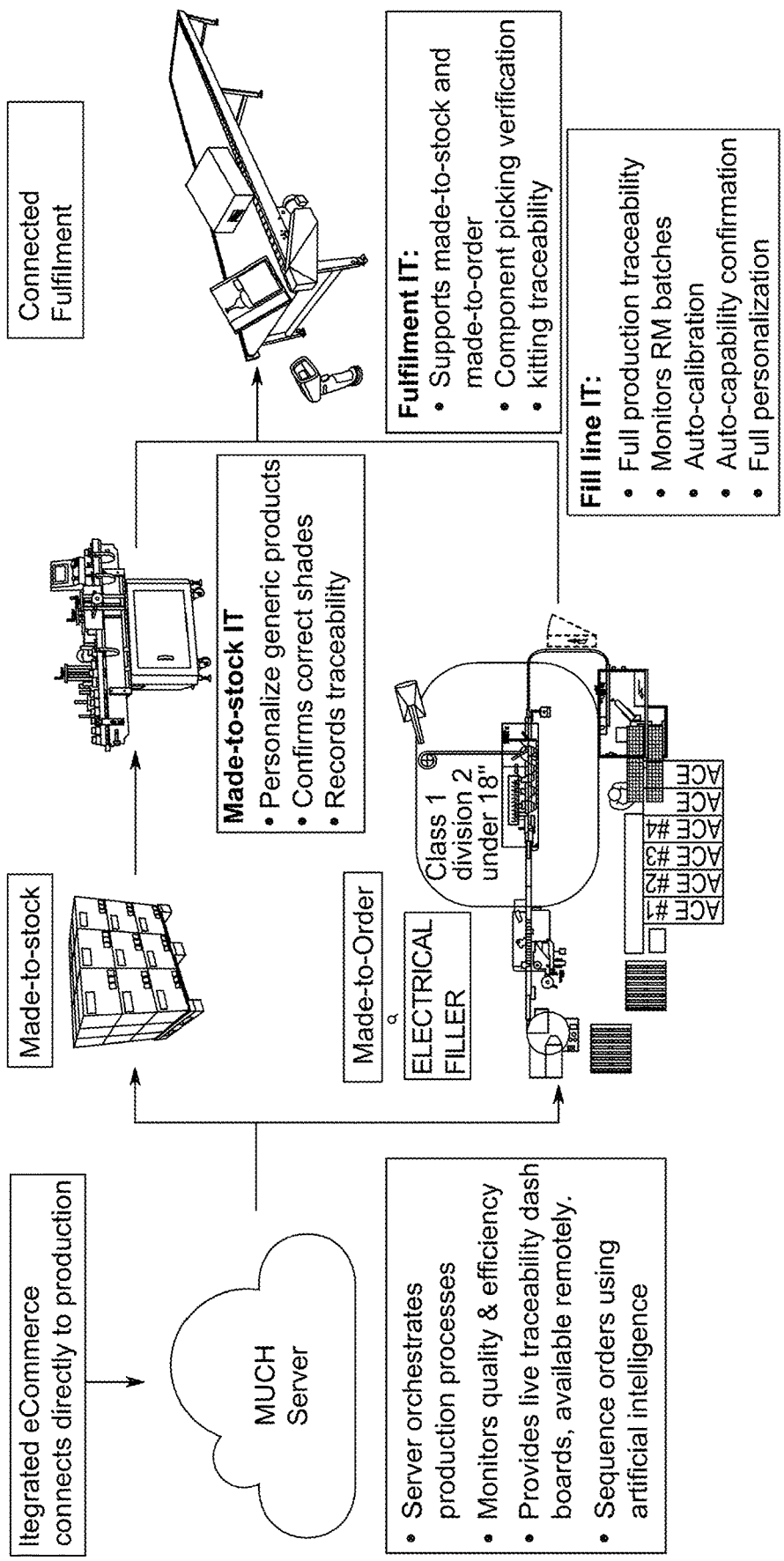
FIG. 1 shows a connection production system according to an embodiment.

In an exemplary system for dispensing hair dye formulations into individual bottles which will be described herein, embodiments makes use of existing "bag in box" components—a soft sided, disposable bag with a bonded fitment that is designed for a "quick connect" interaction with a probe+hose assembly. We use these components in a novel manner to house multiple compounds in close proximity in the explosion proof confines of our fill machine. The bag size is optimized to be large enough to not need refill on the line often, but small enough that the weight of fluid inside can be easily and ergonomically lifted/carried by an operator without mechanical assistance for very quick swapping to reduce machine downtime. The bags are couples with dispensing pumps and do not provide any pressure differential as fluid is extracted because the soft sides of the bag simply collapse. The bags are in corrugate boxes that are cost effective and easily collapsible. On the corrugate boxes are labels with 2D barcodes that encode important data about what is inside each. When a new compound is loaded onto the fill line by the operator, the box is scanned and then a 2D barcode on the end of a corresponding hose is scanned and electronic feedback is given to alert the operator that the right hose is connected to the correct compound (or not if incorrect). This ensures that the correct compounds are being dispensed when they are intended to be.

Most of the materials are loaded into the machine in this "bag in box" configuration (~10 L capacity) but other materials may be coupled to the machine with larger Intermediate Bulk container means plus an intermediate tank. In this case, compounds would be pumped from the large scale containers to an intermediate holding tank which is small enough to not apply too much pressure from gravity on the dispensing pumps.

The fill line described herein uses a linear fill format (empty bottles enter, bottles labeled with serialized 2D barcode labels that can be scanned with a 2D barcode reader. Once bottles reach fill portion of machine, they are scanned and then filled with multiple compounds (5-9 compounds selected from a possible 20-27) per the information corresponding to the serial number per an order database. As each bottle is filled with different compounds, it is not practical to open up every single bottle and do a detailed chemical analysis test or functional test to ensure the compounds and their individual fill quantities are correct. Instead, this system relies on multiple fill position (between 5-7) with multiple nozzles (between 1-6) affixed at each fill position. Each nozzle corresponds to one compound. The compounds are "dosed" in each bottle to makeup a final formula. Bottles are advanced in sequence from one fill position to the next by "walking" type conveyor. In each fill position is a lab quality load cell (readout in the range of 0.1 mg) that are mechanically isolated from vibration. Combined weights can be measured at each fill position.

The fill machine can function in two ways: 1) Production Mode—which is optimized for dispensing speed and 2) Calibration Mode—used periodically to ensure process capability of dispensing nozzles. In Production mode, compounds are dispensed from multiple nozzles all at once and the flowmeters or load cells are used to verify that the expected combined dispense volume or mass (based on the "Recipe" in the order database) is within tolerance. If within tolerance, the bottle continues down the line to the next station. If out of tolerance, the bottle serial number is automatically/electronically marked as reject. In the Calibration Mode, each dispensing nozzle is fired one by one multiple times, and the volume or weight of each individual dispense is checked by a fluid meter or the load cell and electronically recorded. If the distribution of dispenses represent a high Cpk (process capability) value, the machine is considered qualified and is approved for production until the next scheduled Calibration check period.

In an embodiment, sequence orders of the bottles may be configured using artificial intelligence to enhance efficiency. For instance, sequencing may be performed dynamically based on predicted fill times of each of a plurality of bottles based on the respective formulas for each bottle.

Moreover, the system described herein produces personalized cosmetic products on demand in a factory. The machine is comprised of several different stations linked together by collaborative robots. The system is self-organizing, and the stations figure out on their own what they need to do in order to produce the products. The system can produce several SKUs concurrently at no efficiency loss. The same system can be used for many different types of products.

Additional details are described below and in the accompanying figures FIG. 1 depicts a connection production system for integrating eCommerce directly to production, so that personalized products can be made-to-order at a filling system in order to make individual hair dye kits that are customized for users. As shown in FIG. 1, a server orchestrates production processes, monitors quality & efficiency, provides live traceability dash boards, available remotely, and may sequence orders using artificial intelligence.

FIG. 1 further shows that there may be two paths in the production process: a "made-to-stock" path and a "made-to-order" path. The "made-to-stock" path may produce bottles of stock or generic dye colors which are in high demand. The "made-to-stock" path further personalizes generic products; confirm correct shades; and records traceability of an order.

The "made-to-order" path includes a specialized fill station which will be discussed in more detail below. The "made-to-order" path provides full production traceability; monitoring of RM batches; Auto-calibration of the dispensing mechanisms of the fill station; auto-capability confirmation; and full personalization.

Either of the above two paths leads to the connected fulfillment section of the process, where component picking verification is performed as well as ensuring traceability of the dye and developer kits which are produced.

Figure 2:
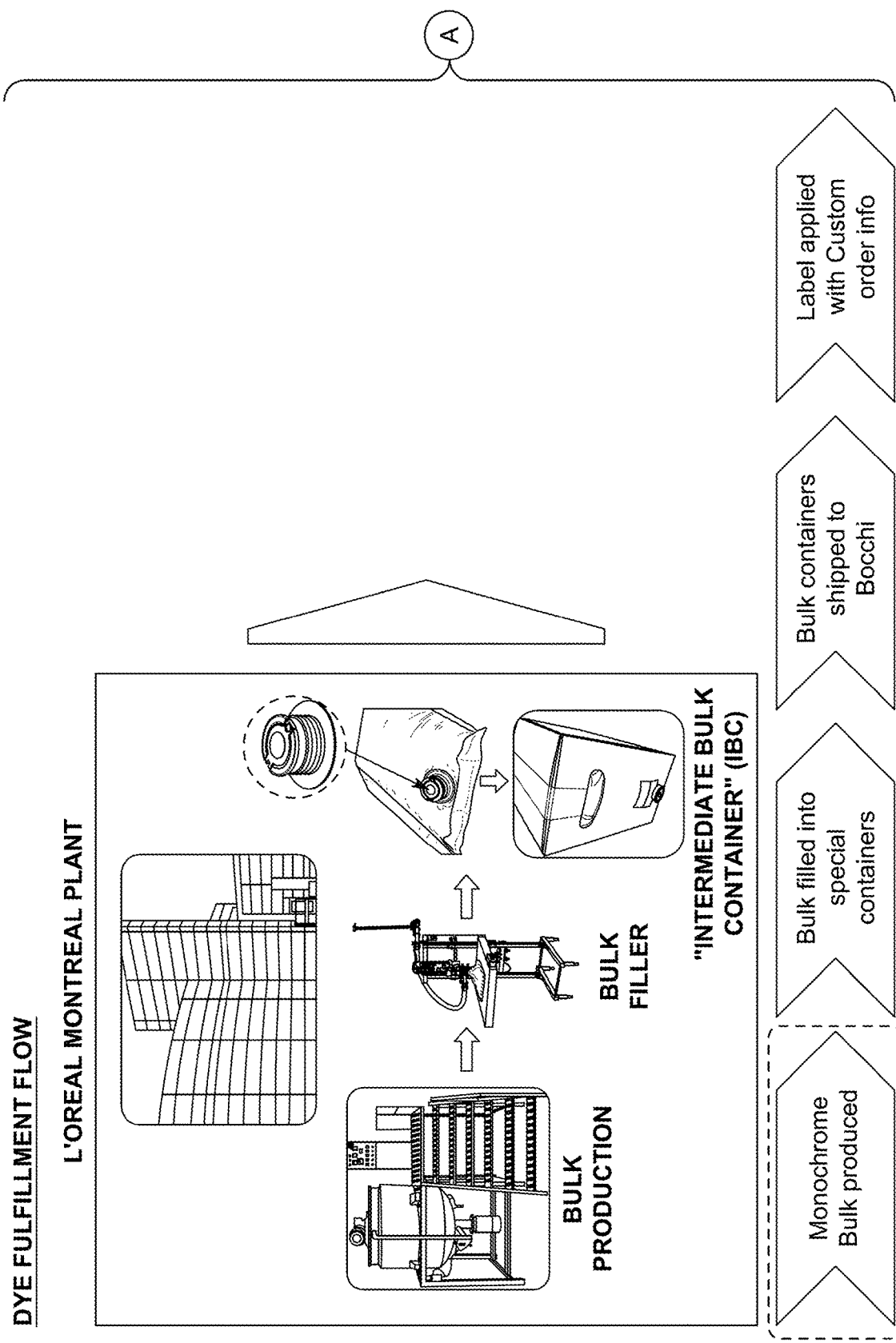
FIG. 2 shows a process of dye fulfillment flow according to an embodiment.
Figure 2:
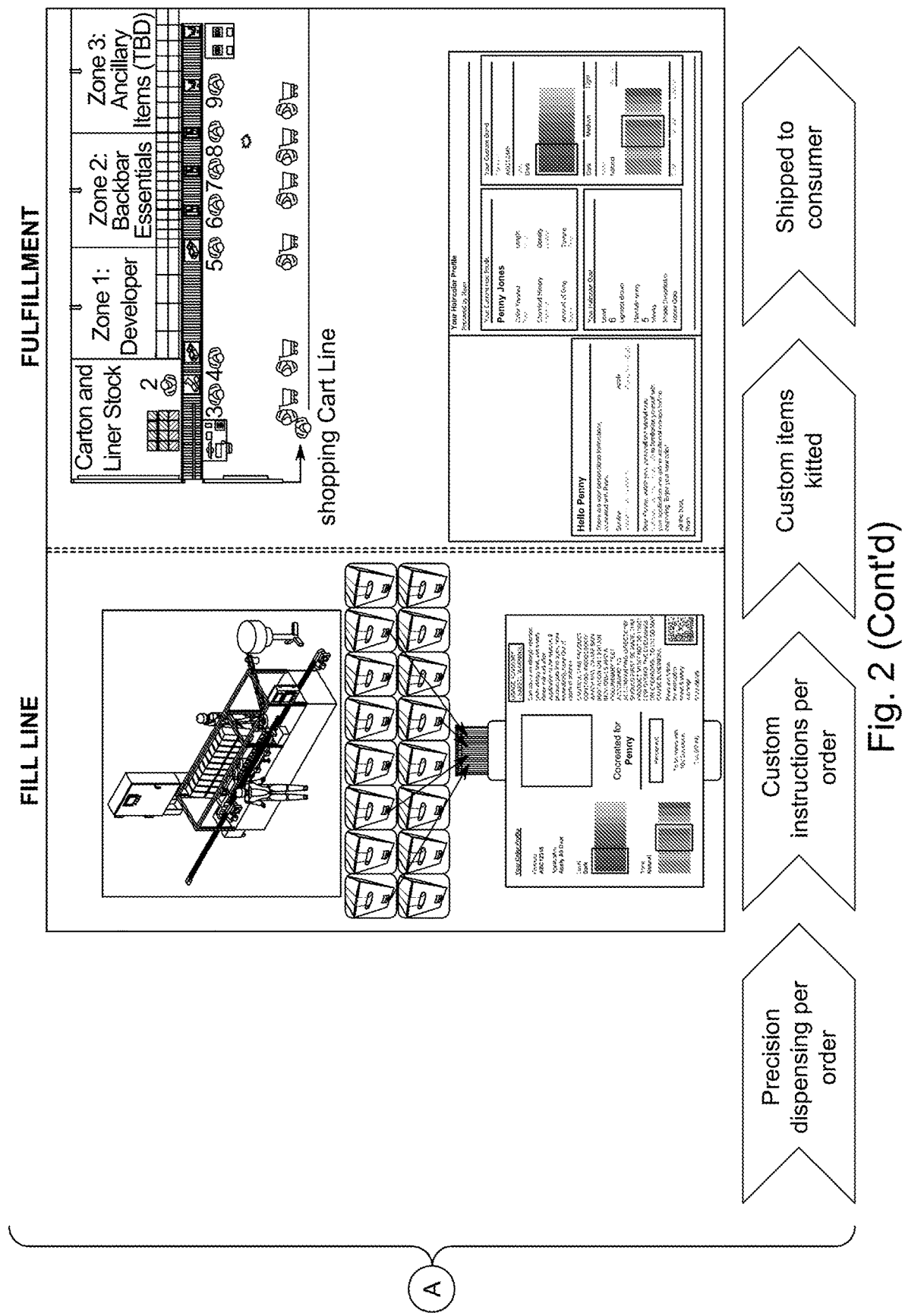

FIG. 2 provides an overview of the dye fulfillment flow, which shows the process from bulk production of the dye monochromes, to bulk filling of the intermediate batch containers, to the fill line, to fulfillment.

Figure 3:
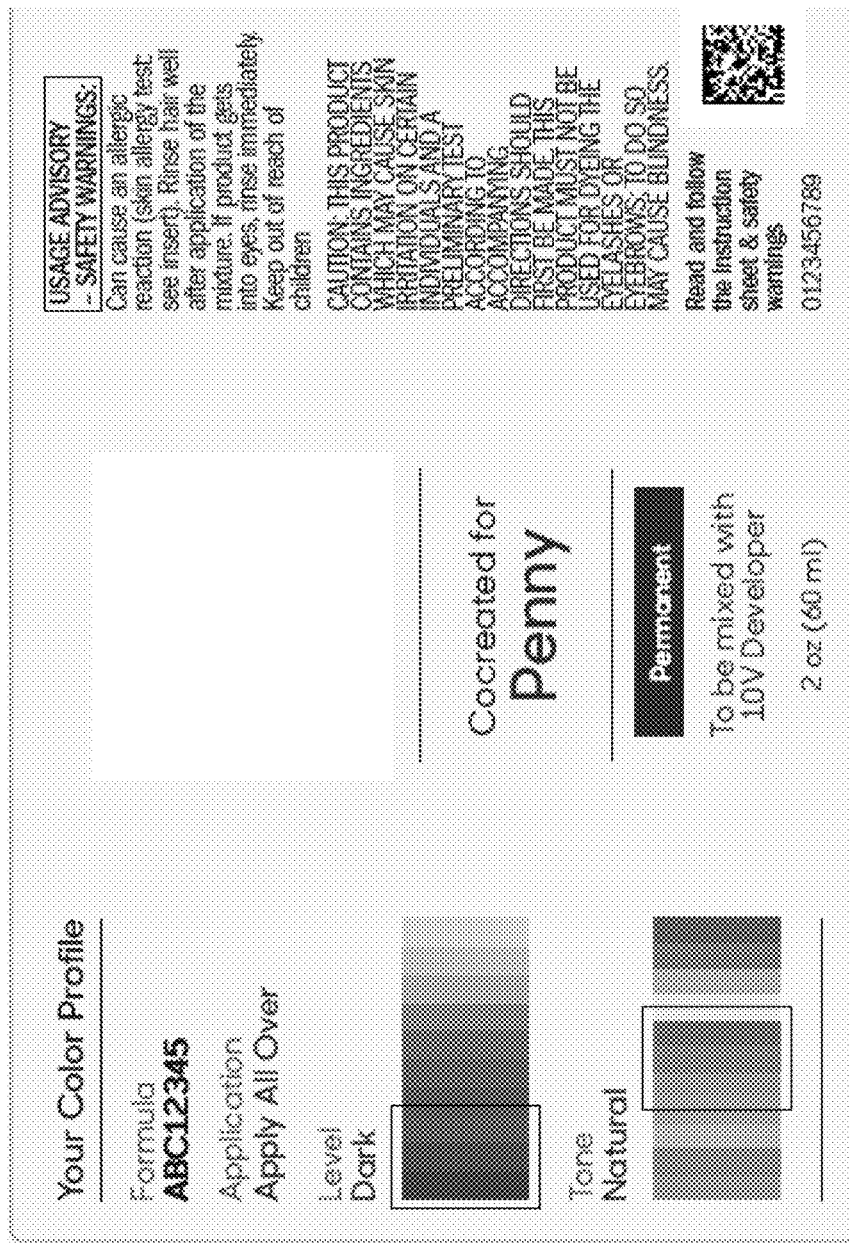
FIG. 3 depicts a label that may be applied to a bottle of a customized dye formulation produced by the system according to an embodiment.

FIG. 3 depicts a label that may be applied to a bottle of a customized dye formulation produced by the system. Among other information, the label specifies the customer name, the formula number, the recommended application, the shade level, and the tone.

FIG. 4 shows an overview of the fill line and personalization process according to an embodiment. It can be seed that there are two components involved in this process: a fill line (dispensing occurs) and a fulfillment line (where kits are assembled and personalized labels are produced and applied).

Figure 5:
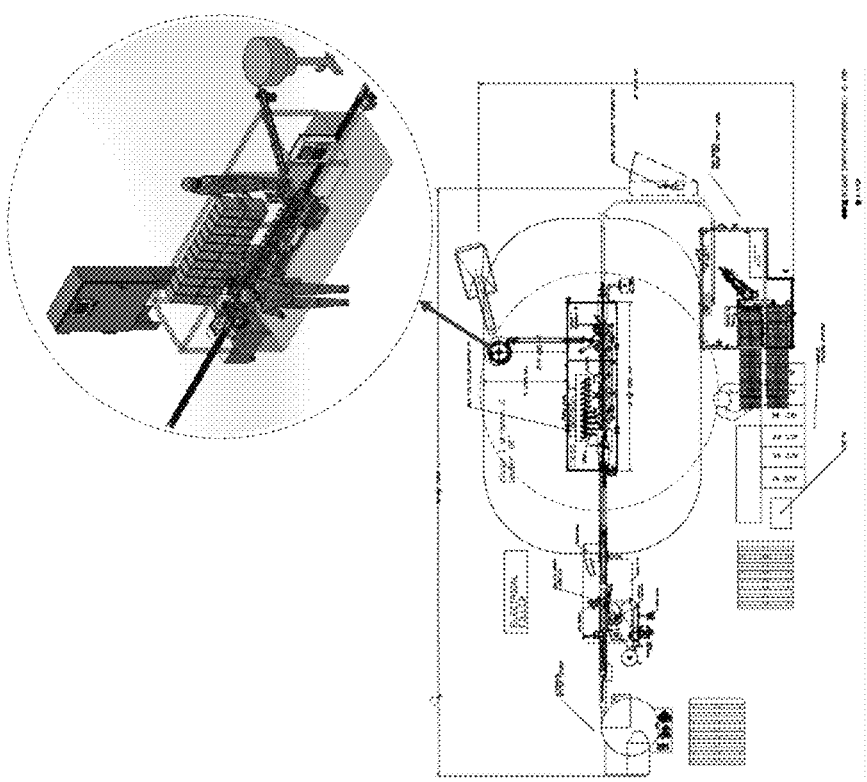
FIG. 5 shows an overview and statistics of a personalized fill line according to an embodiment.

FIG. 5 shows an overview and statistics of a personalized fill line. It can be seen that the personalized fill line described in the present embodiments provides:

Fastest personalized manufacturing to date (10 units per minute).
100% traceability and full unit serialization
In-line quality checks
Highly automated (<1 Full Time Operator required)
Highly adaptable to allow for new dye colors in future
Directly linked to kitting line
Internet connected per Industry 4.0 standards Additionally, the capacity of production of the fill line will increase heavily in the coming years with just 1 or 2 machines being needed.

FIGS. 6A-6E shows a walkthrough of different aspects of the fill line.

Figure 6A:
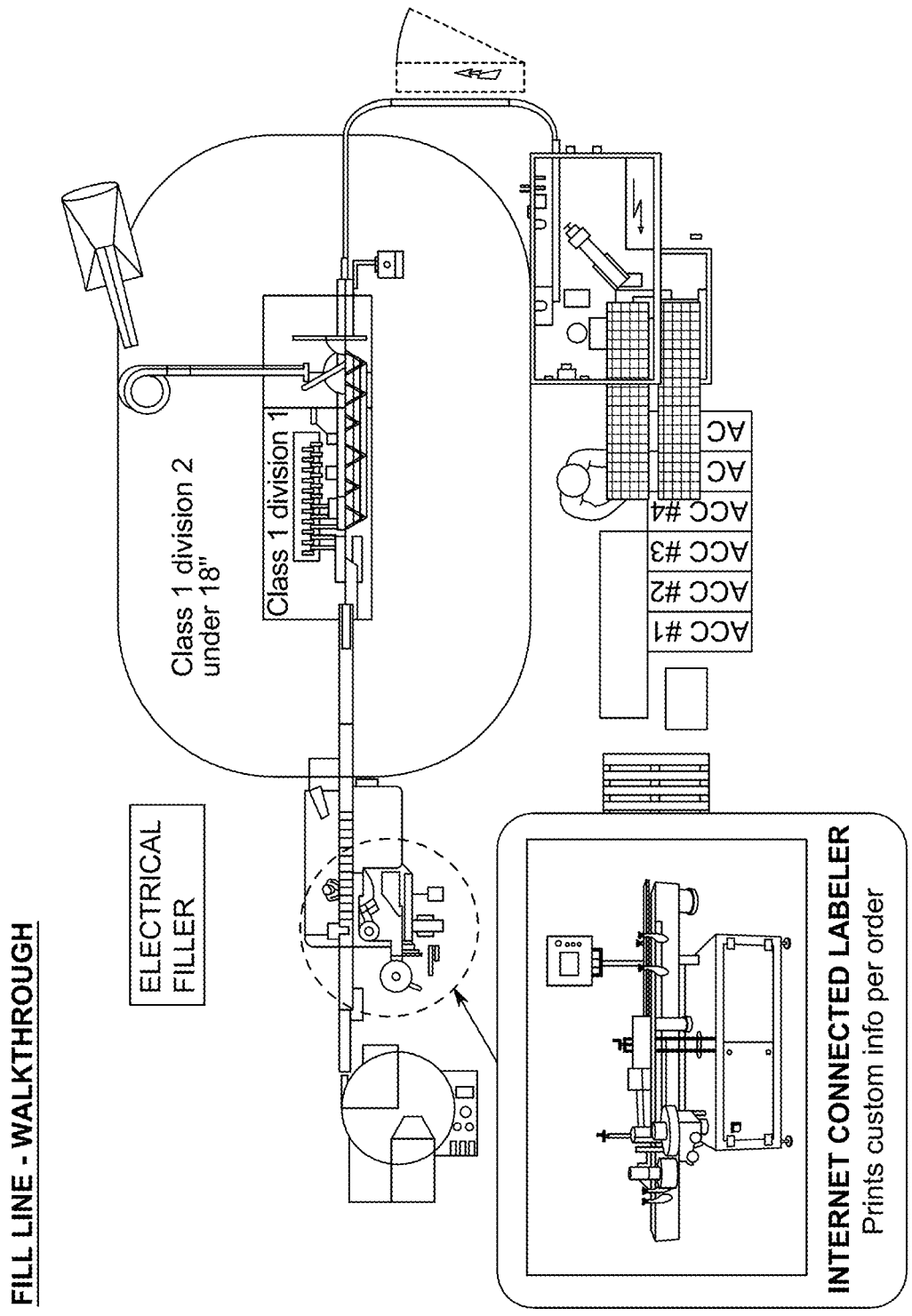
FIGS. 6A-6E shows a walkthrough of different aspects of the fill line according to an embodiment.

FIG. 6A shows that an internet connected labeler prints custom info per order, and the labels can be applied at the egress of a bottle feeder.

Figure 6B:
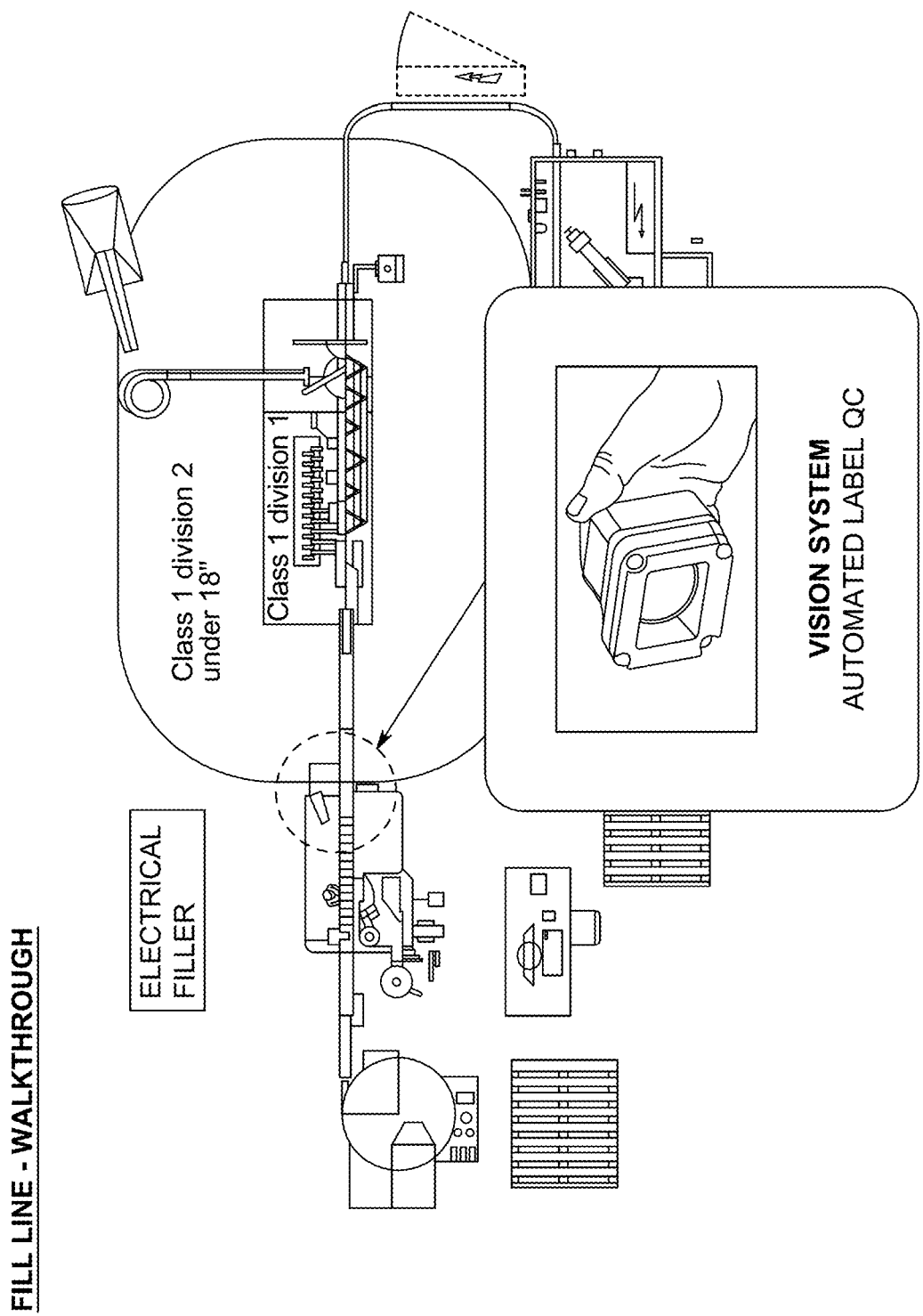

FIG. 6B shows that a vision system can be used to scan the label after it is applied to ensure accuracy and enhance quality control.

Figure 6C:
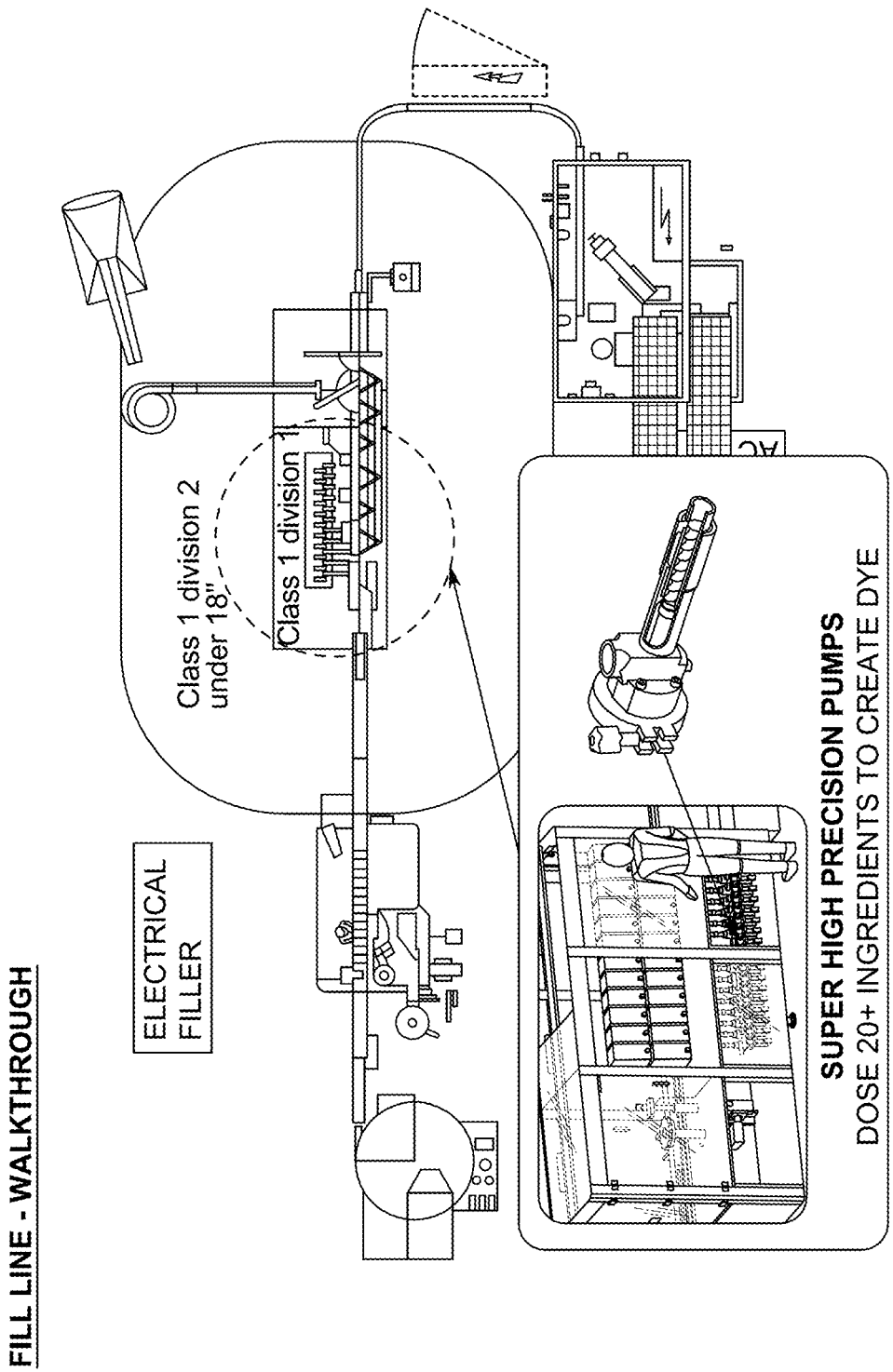

FIG. 6C shows that super high precision pumps can be used to dose a large quantity of ingredients from the corrugated containers to create a custom dye formulation.

Figure 6D:
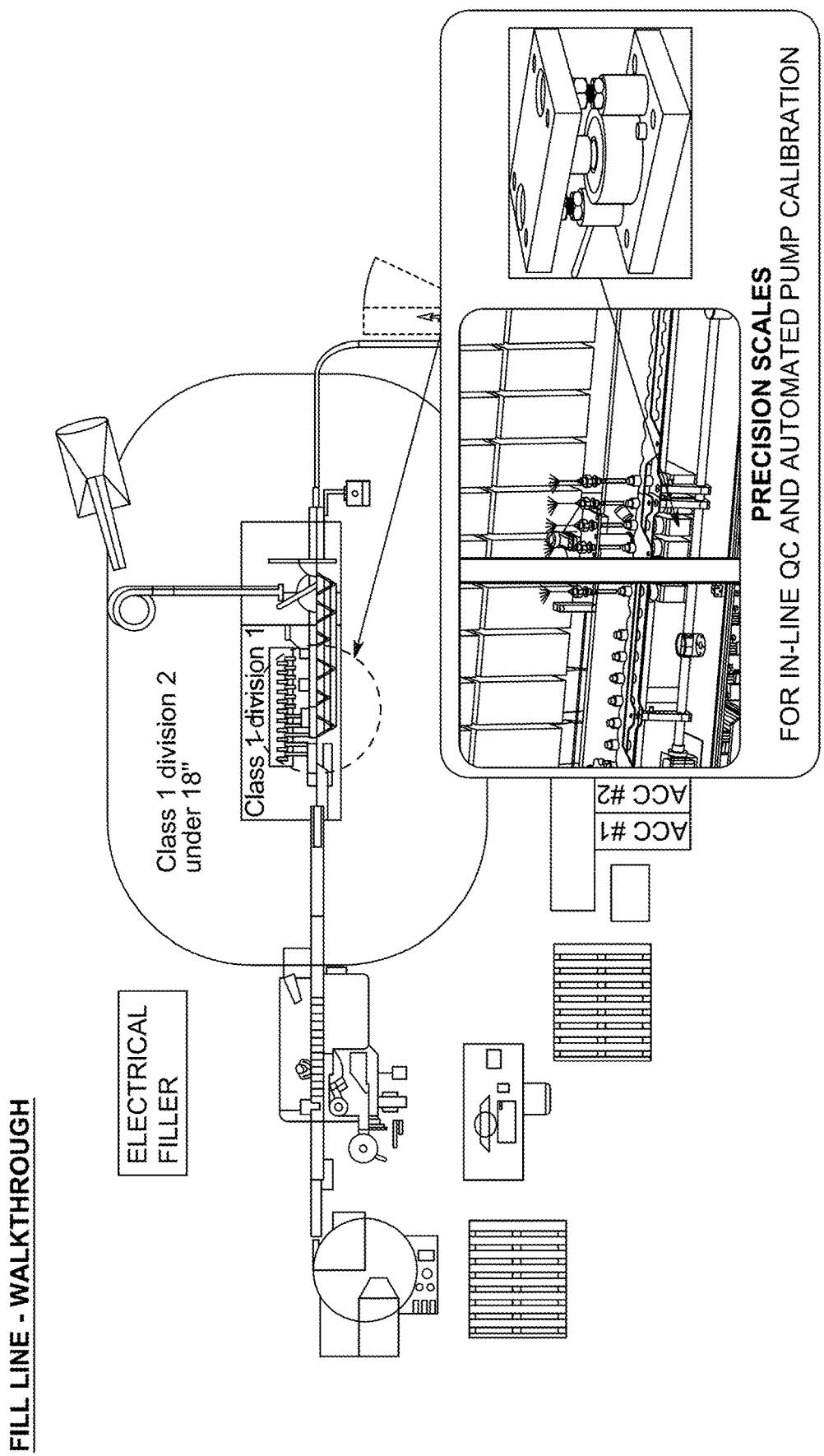

FIG. 6D shows that precision scales can be used for in-line quality control and automated pump calibration.

Figure 6E:
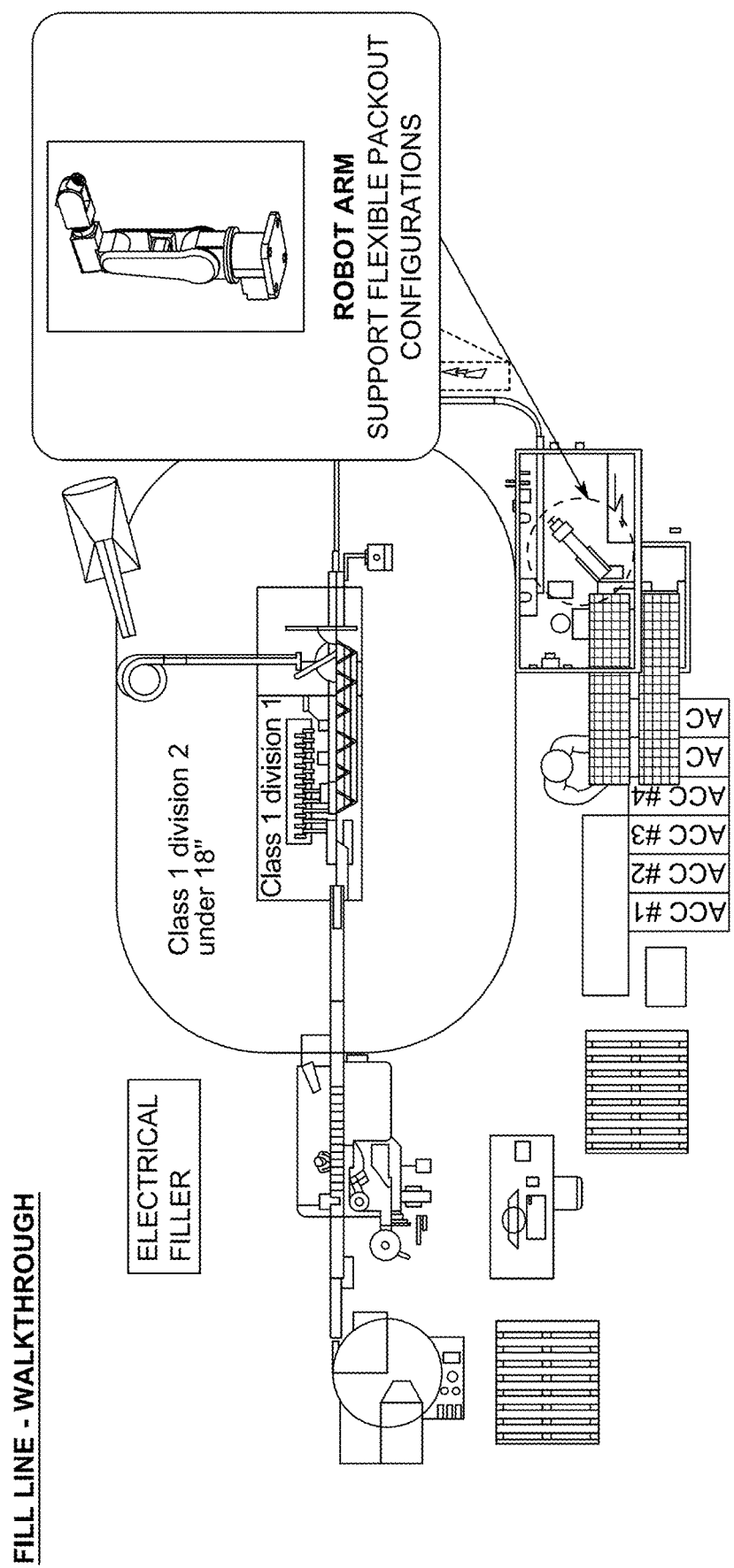

FIG. 6E shows that a robot arm may be used at fulfillment to support flexible packout configurations.

Figure 7:
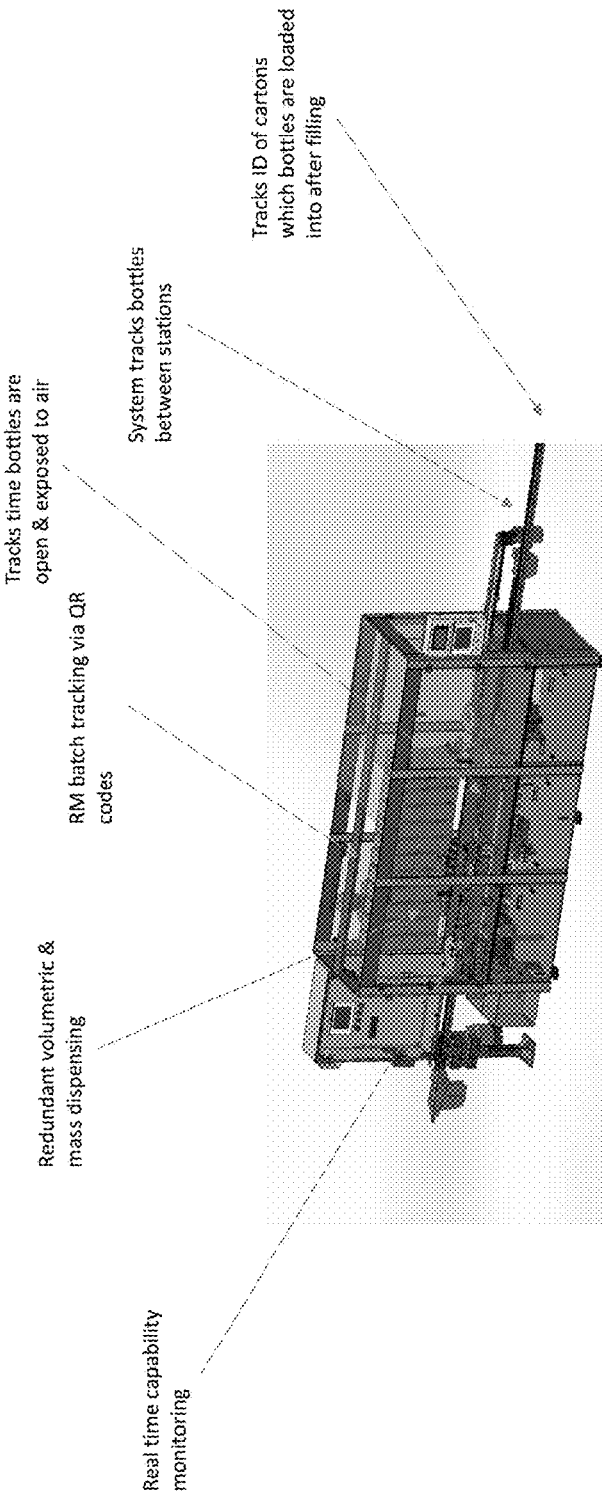
FIG. 7 shows an over view of the fill station technology according to an embodiment.

FIG. 7 shows an over view of the fill station technology. The fill line and dispensing station applies several simultaneous functions, such as real time capability and monitoring, redundant volumetric & mass dispensing, RM batch tracking via QR codes, the ability to track the amount of time bottles are open and exposed to air, tracking bottles between stations, and tracking the identification of cartons which bottles are loaded into after filling.

Figure 8:
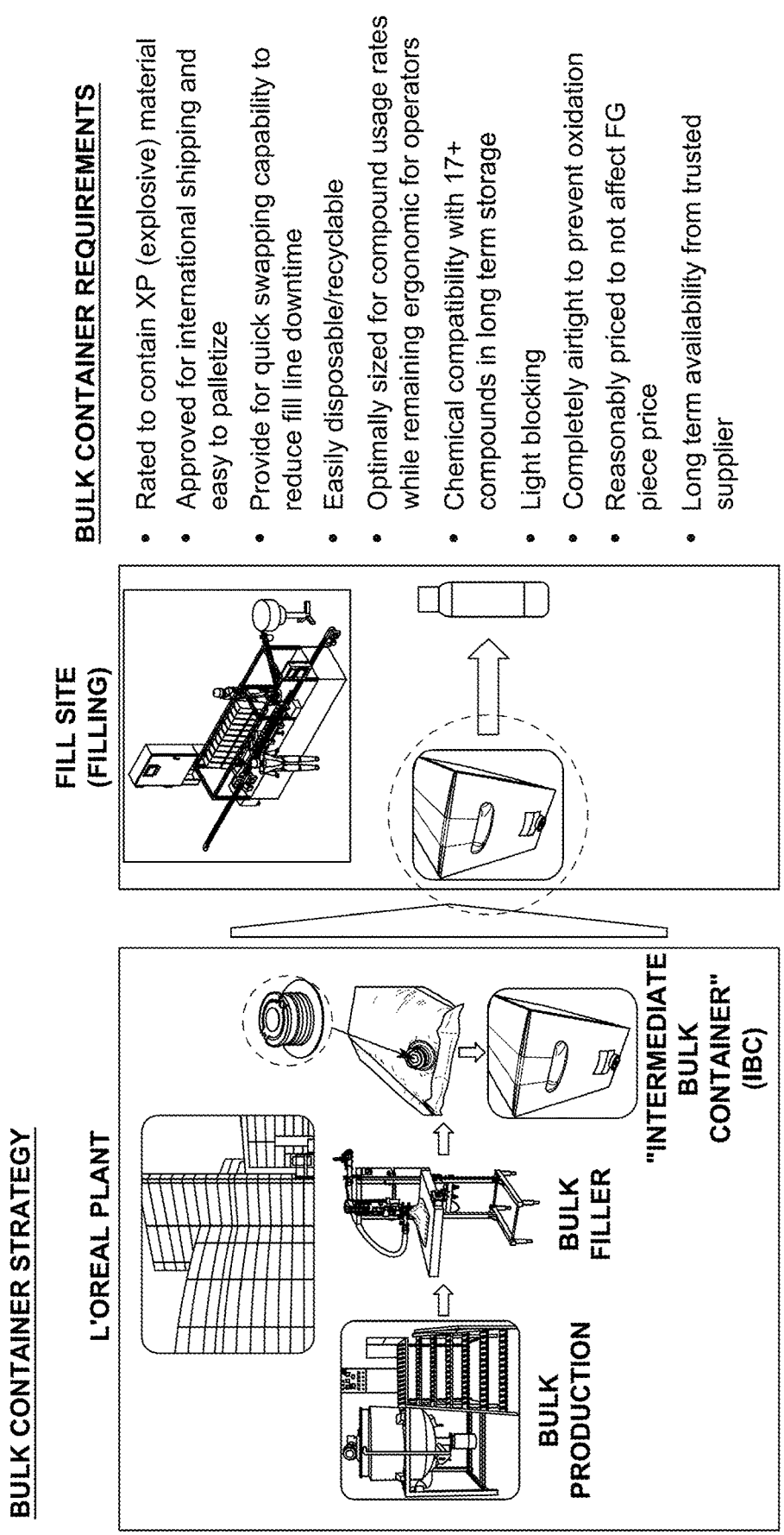
FIG. 8 shows a bulk container strategy according to an embodiment.

FIG. 8 shows a bulk container strategy which can be used to provide a size of bulk hair dye volume that is compatible with the needs of the fill station. The strategy involves filling intermediate bulk containers (IBCs) at a plant where a combination of bulk hair dye production and a specialized bulk filler can be used to fill a "bag" like container with hair dye, and then a box container can be used to hold the bag for safe storage. The bag may be collapsed into the box and the bags may be sized according to a usage rate.

This bulk container strategy provides the following features.

Figure 9:
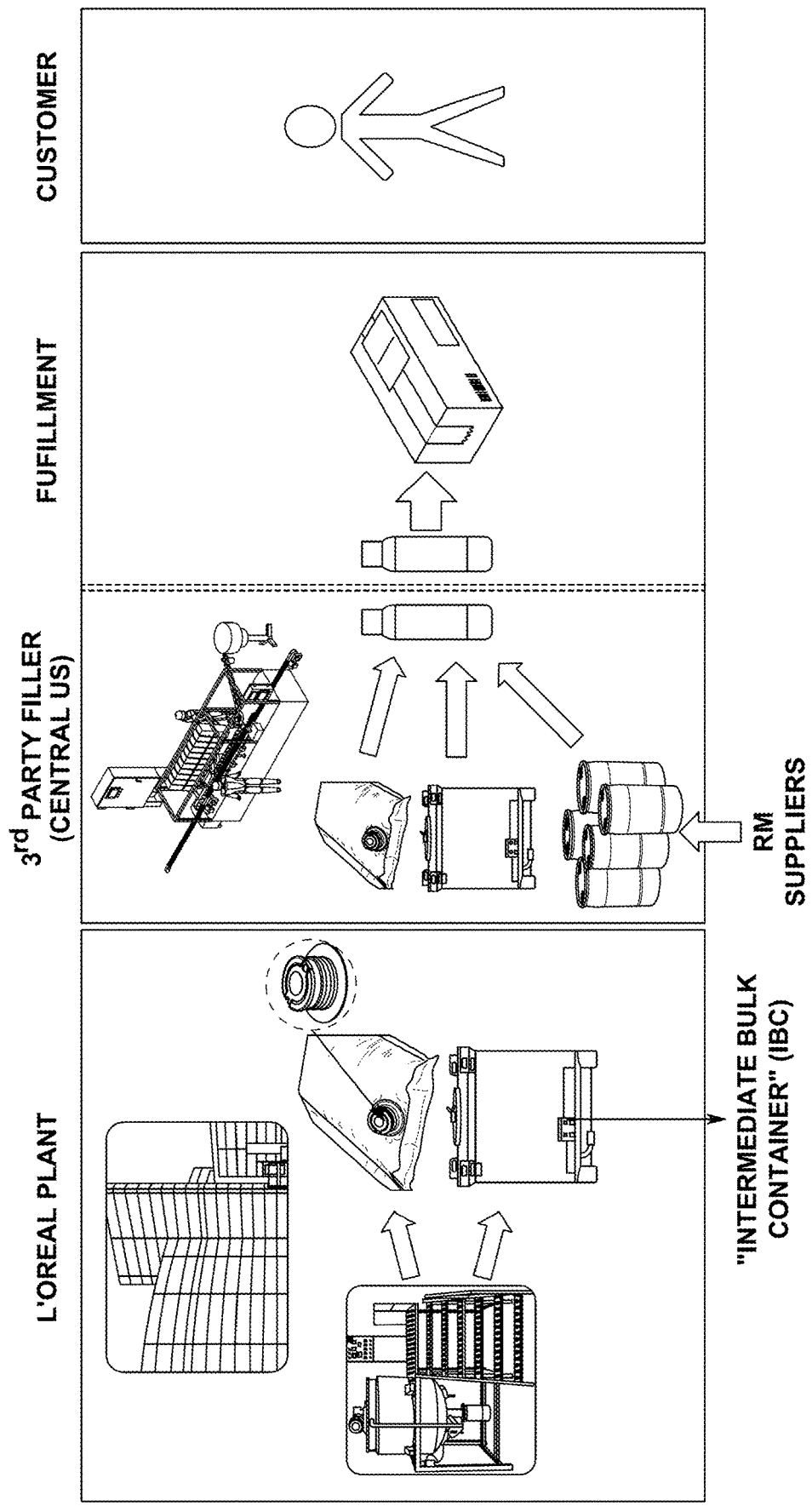
FIG. 9 shows more details related to the bulk container strategy according to an embodiment.

- Rated to contain XP (explosive) material
- Approved for international shipping and easy to palletize
- Provide for quick swapping capability to reduce fill line downtime
- Easily disposable/recyclable
- Optimally sized for compound usage rates while remaining ergonomic for operators
- Chemical compatibility with 17+ compounds in long term storage
- Light blocking
- Completely airtight to prevent oxidation
- Reasonably priced to not affect FG piece price
- Long term availability from trusted supplier FIG. 9 shows more details related to the bulk container strategy. It can be seen that hair dye bottles can be filled not just by the boxed IBCs utilized at a fill station at third party site, but they can also be filled based on larger containers provided by RM suppliers, which may supply the developer to the third party site.

Figure 10:
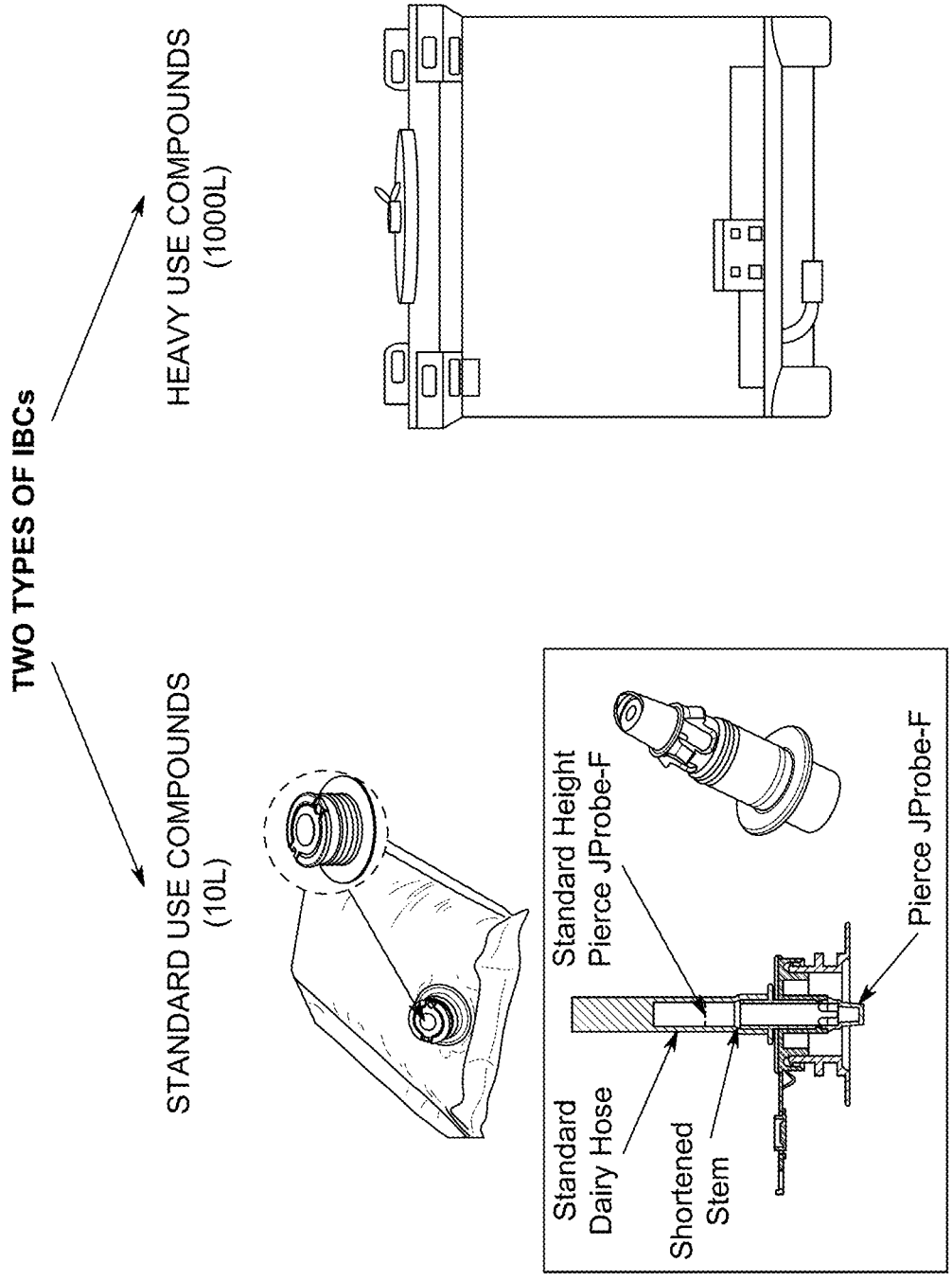
FIG. 10 shows that there are two types of intermediate bulk containers (IBCs) in an embodiment.

FIG. 10 shows that there are two types of intermediate bulk containers (IBCs). The first type is described above as the "bag"-type container that stores standard use compounds and can be accessed using a special valve and probe to form an airtight seal as shown in FIG. 10. The second type is a larger sized hardened container that holds heavy use compounds.

FIG. 11 shows details of the "bag-in-box" type of IBC and FIG. 12 shows details of the heavy use IBC.

Figure 13:
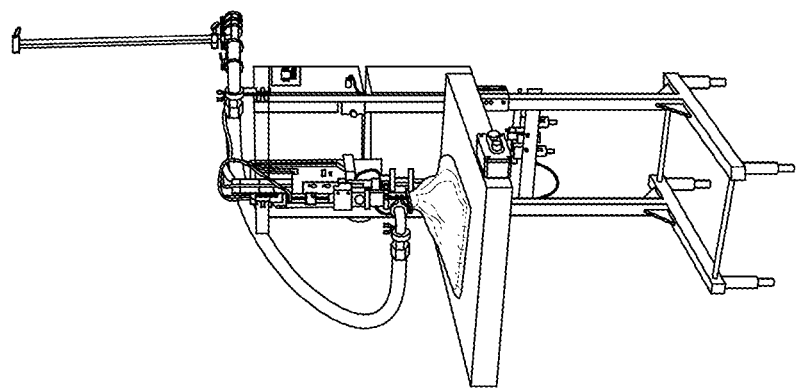
FIG. 13 shows the IBC filling equipment used during production in an embodiment.

FIG. 13 shows the IBC filling equipment used during production.

FIG. 14 shows details related to the containers used for direct RM ingredients such as ammonia.

Figure 15:
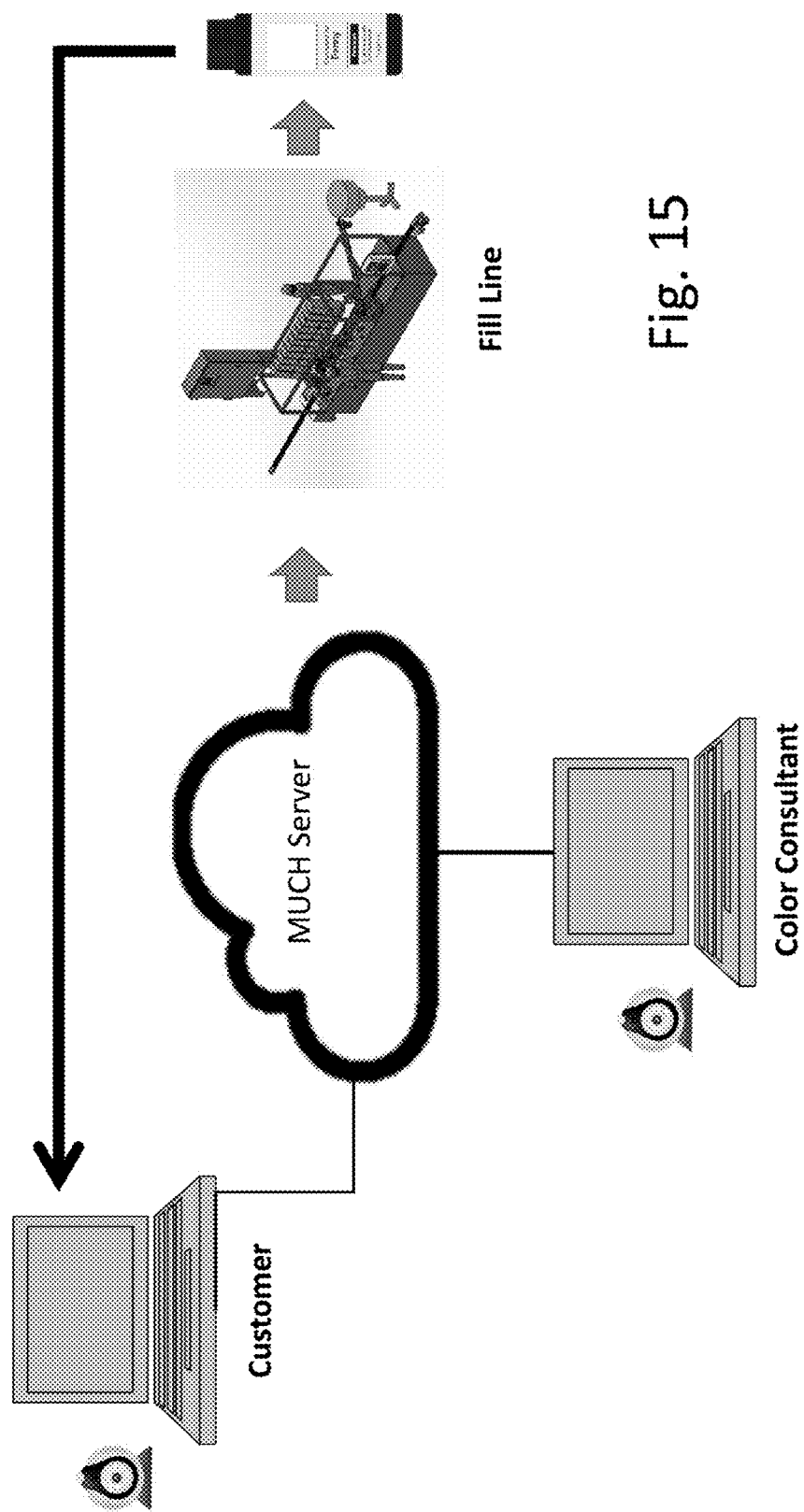
FIG. 15 shows an overview of a process and system to receive an order of a personalized dye according to an embodiment.

FIG. 15 shows an overview of a process and system to receive an order of a personalized dye 1560 according to an embodiment. The system includes a customer site device 1510, a color consultant site device 1520, and the fill site 1550 described above. A server 1530 or any combination of devices (such as a cloud network) may be connected to each of the customer device 1510, the color consultant 1520, and the fill line site 1550. A controller device 1540 may control the functionality performed at the fill line site 1550.

In the system of FIG. 15, an application is provided which is configured to allow a customer to input user information in order to generate a prescribed formula which is used to dispense a custom color. The application may be installed on a server site and be accessed by a user via a web browser or an application ("app") for example. Additionally, the application, or a different application which is also installed on the server site may be accessed by a color consultant via a web browser or an application.

In an embodiment, the customer may be presented with two options: (1) speak with a color consultant, or (2) take a color quiz or questionnaire. In option (2), the customer may answer a series of questions about their hair and hair goals, and based on the answers, a recommended hair color product will be generated automatically and provided to the user. However, during the quiz the customer will always have the option to exit and choose option (1). Additionally, based on the answers to the quiz, such as previous use of a non-dye color treatment, the user may be required to speak to a color consultant.

The application for the customer and the application for the color consultant is configured to facilitate a video consultation session between the customer and the color consultant.

The operating system of the computer devices used by the customer, the color consultant, any other points in the system can have a user interface that is configured to perform multiple functions. In an aspect, the device can be in communication with a network and enable the user interface access to the Internet as well as Internet of Things (IOT). As can be appreciated, the network can be a public network, such as the Internet, or a private network such as an LAN or WAN network, or any combination thereof and can also include PSTN or ISDN sub-networks. The network can also be wired, such as an Ethernet network, or can be wireless such as a cellular network including EDGE, 3G and 4G wireless cellular systems. The wireless network can also be WiFi, Bluetooth, or any other wireless form of communication that is known.

The device can also have a camera function either integrated or external that can be used facilitate the video session.

The below description relates to details of how Information Technology (IT) organization can further enhance the performance of the fill line.

Figure 16:
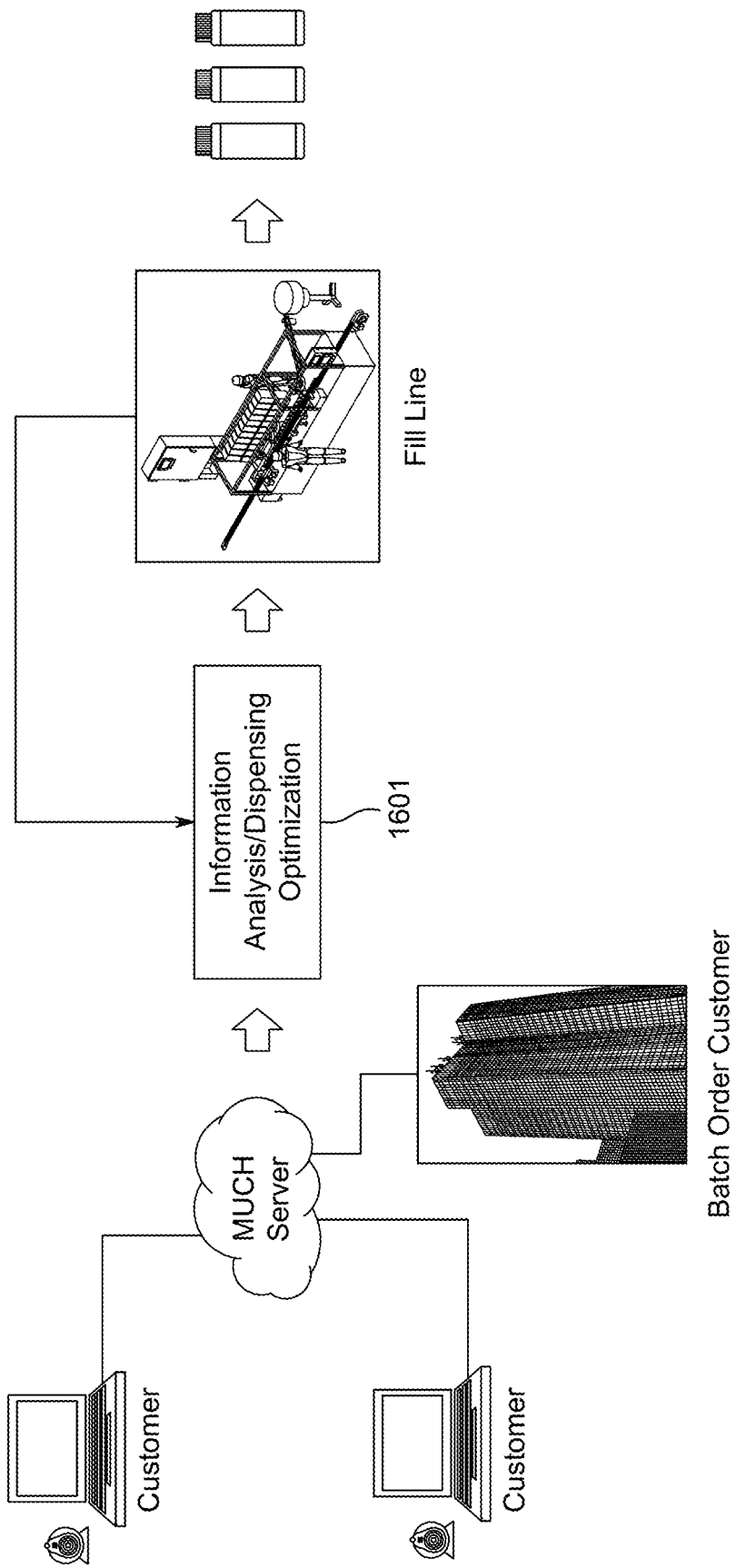
FIG. 16 shows an overview of a process and system to receive an order of a personalized dye from different types of customers.

FIG. 16 shows an overview of a system similar to that shown in FIG. 15. FIG. 15 shows that there may different types of customers connected to a server on a network, such as individual customers and batch order customers. Also included in the system is a controller 1601 which performs information analysis and optimization of the dispensing performed by the fill line based on the customer orders and based on feedback from the fill line, which will be described below.

Sequencing Optimization

As mentioned above, sequencing may be performed dynamically based on predicted fill times of each of a plurality of bottles based on the respective formulas for each bottle.

For instance, the system can take into account a plurality of orders to be filled and the recipes for each and determine the most efficient manner of dispensing compounds into the bottles to reduce overall wait time while filling.

Figure 17:
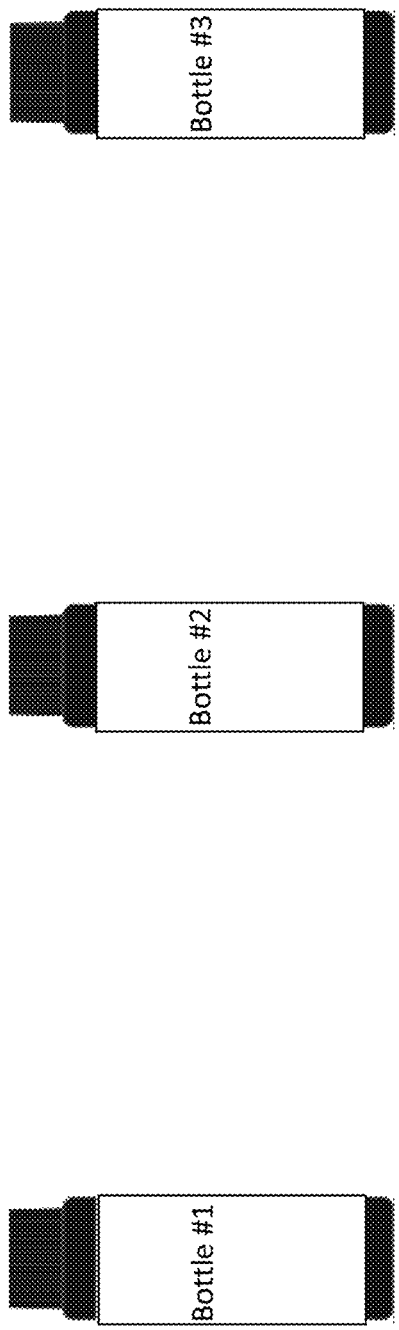
FIG. 17 shows a plurality of bottles to be filled based on orders received from various customers.

FIG. 17 shows a plurality of bottles to be filled based on orders received from various customers. It can be seen that each bottle has a recipe corresponding to specific nozzles at the specific fill positions along the fill line. Additionally, the volume of doses to be filled may affect the amount of time it takes for a bottle to remain at a fill station, and this information may be also be associated with the recipe for the bottle.

Figure 18:
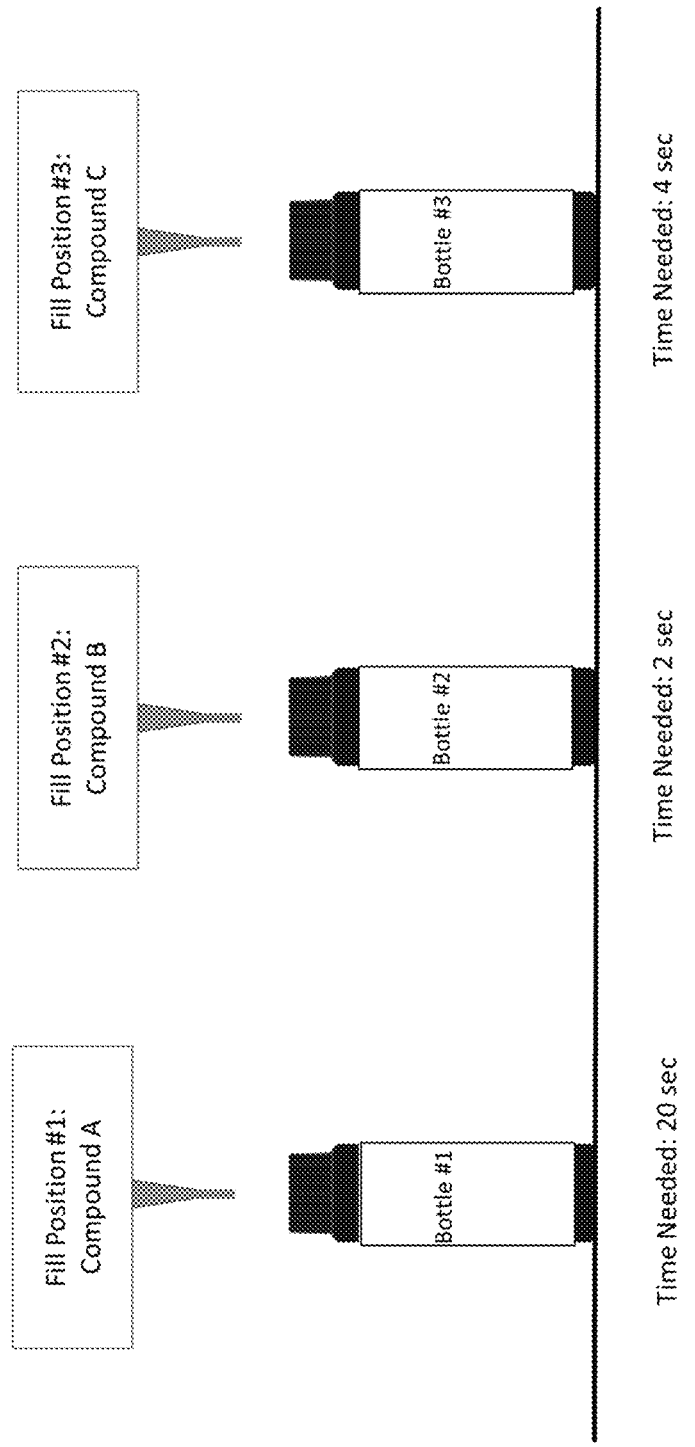
FIG. 18 shows a scenario where a rearrangement of the sequence of bottles is not optimized.

FIG. 18 shows a scenario where a rearrangement of the sequence of bottles is not optimized and bottles #1 and 2 are adjacent to each other in the fill line, with bottle #3 at a third position.

Figure 19:
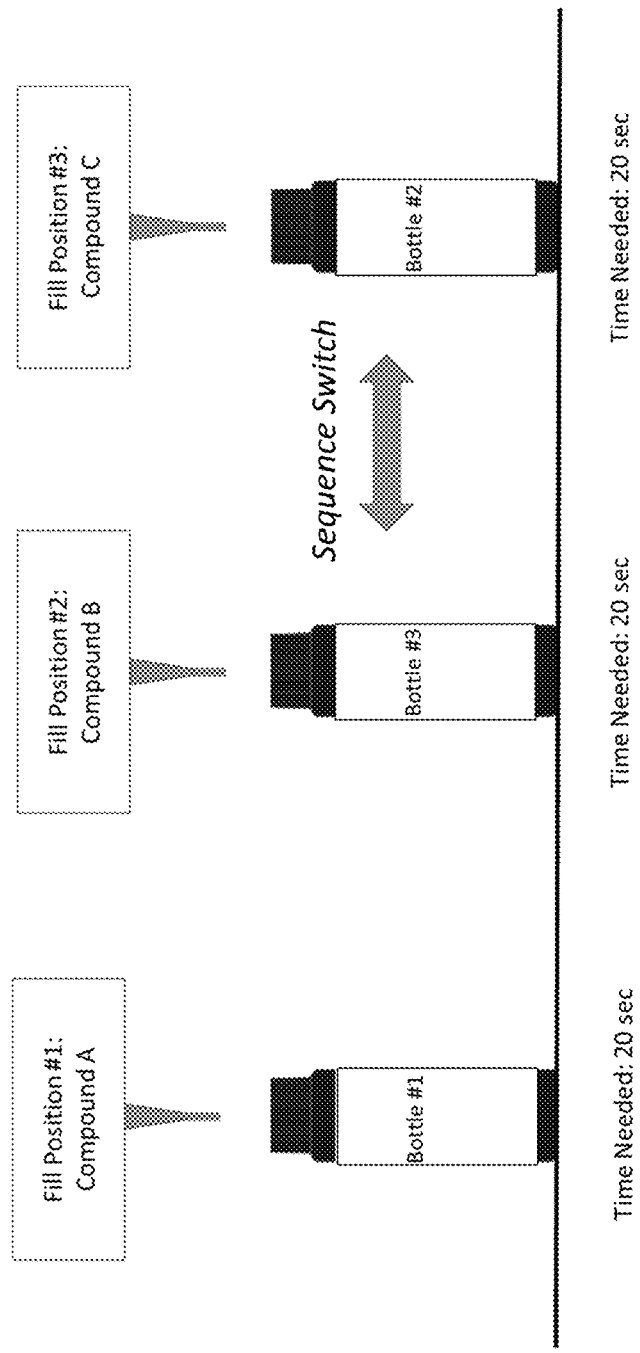
FIG. 19 shows a scenario where a rearrangement of the sequence of bottles has been optimized.

It can be seen that after a sequence of bottles #2 and #3 are switched in FIG. 19, all of the bottles have a coinciding fill time of 20 seconds for their respective compound in the same fill time period. Therefore, assuming that the conveyor belt of the fill line cannot move forward until each bottle a completed a dispensing operation at each fill position, the above optimization technique allows for resequencing the bottles so that when a maximum number of bottles are being filled with their largest quantity at the same time, and ideally this will allow for less "lingering" bottles and more opportunities for all the bottles to receive a smaller dose in the same time period, so the conveyor belt can advance more quickly during those shorter dispensing time periods.

To manage the re-sequencing of the bottles, when a plurality of orders is received, they can be placed in separate queues, and each queue can be analyzed to determine the optimal sequence. Preferably, to accomplish this goal, the system can determine every possible sequence for the orders in the queue, and the total time spent in the fill station can be calculated for each sequence given the known recipes and dispensing times. Then a minimum total time value can be used to determine the selected sequence.

Figure 20:
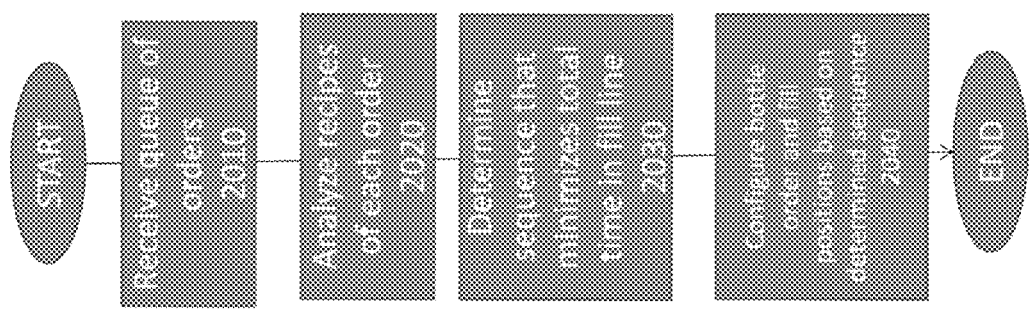
FIG. 20 shows a flowchart performed by the system to optimize a sequence of the bottles in the fill line.

FIG. 20 shows a flowchart performed by the system to optimize a sequence of the bottles in the fill line. In step 2010, a queue of orders received, where the queue has a predetermined size as discussed above. In step 2020, the recipes of the orders are analyzed and each fill station and dispensing time is determined based on the recipes. In step 2030, every possible sequence is analyzed and a sequence which minimizes the amount of time in the fill line for completing the queue is determined. In step 2040, the sequence is output to the controller to configure the bottle order and the dispensing operations to be performed in the fill line at the appropriate timings.

Nozzle Grouping Optimization

To further optimize the system described above, data may be collected over time to determine the usage rates of the different compounds being dispensed by the fill station. For instance, as noted above, there may be a compound which is a dominant compound being used in a recipe and which requires a longer fill time. To optimize the fill times, the most heavily used compounds may be preferably separated across different fill positions. Alternatively, if there are particular compounds which are used at a very high rate, then such a compound my preferably be dispensed at multiple fill positions. In any case, the usage rates may be periodically checked to output a recommendation to adjust the location of compounds at the fill positions in the system.

Figure 21:
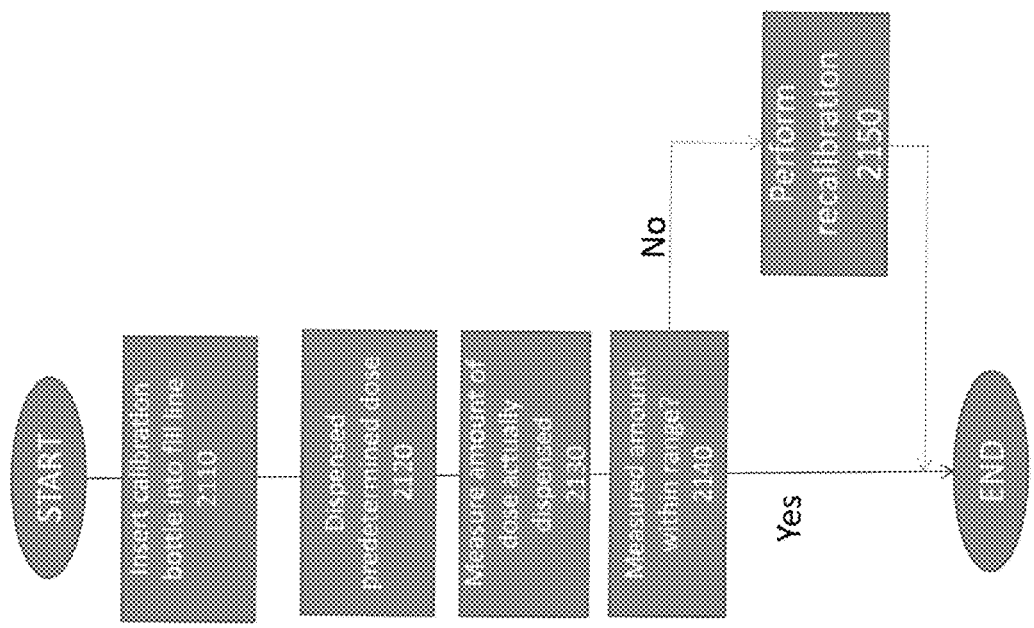
FIG. 21 shows a process of self-calibration performed by the system.

FIG. 21 shows a process of self-calibration performed by the above-described system. In step 2110, the calibration bottle is inserted into the fill line. The production mode may be paused at this time. Alternatively, the calibration bottle is within a sequence of a production bottles being inserted into the fill line. In step 2120, the predetermined dose is dispensed into the calibration bottle as described above. In step 2130, the amount of dose actually dispensed into the calibration bottle is measured. As discussed above, the measurement may be performed by either a flowmeter or a load cell. A determination is made at step 2140 on whether the measured amount is within a tolerance range. If so, then the process ends. Otherwise, the process proceeds to step 2050 for performing recalibration of the dispensing of a specified nozzle or any other equipment as necessary.

The bottle may receive the calibration doses from each nozzle at each fill position in the fill line. Alternatively, multiple calibration bottles may be sent through the fill line to take separate doses from each nozzle, or a separate calibration bottle may be used at each fill position for the multiple nozzles at the fill position. In the latter scenario, the nozzles may dispense the calibration doses separately in a predefined sequence, or they may dispense in unison. If they dispense in unison, and the measured volume or weight is not a precise expected sum for a particular fill position, then a new calibration bottle may be sent to measure the amount dispensed from each nozzle at the particular fill position to determine if one or more nozzles need to be calibrated.

Flexible Production of Cosmetics

Figure 22:
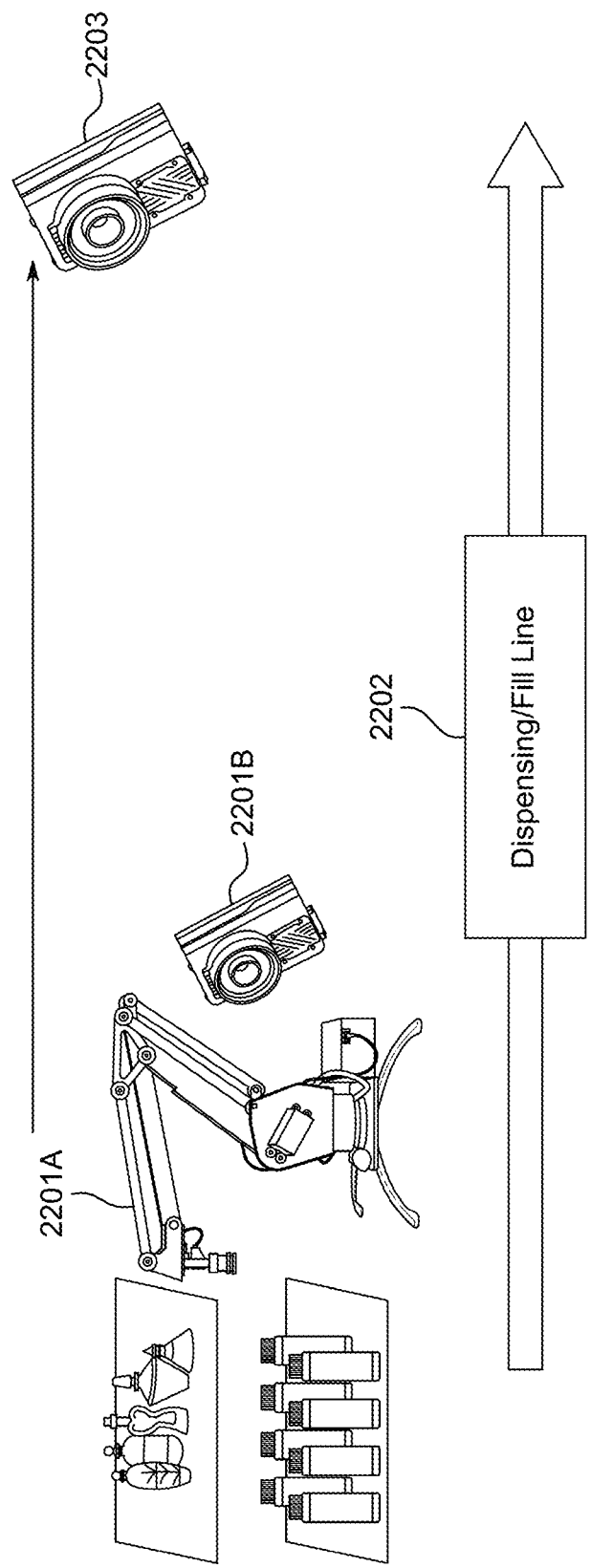
FIG. 22 shows a system which allows for the flexible production of cosmetics in a system.

FIG. 22 shows a system which allows for the flexible production of cosmetics in a system similar to the hair dye fill station described above. The concept is based on providing flexible control and coordination at the ingress and egress of a dispensing system, such that a variety of types of products (such as different SKUs) can be efficiently created in the dispensing system.

FIG. 22 shows that a robotic arm 2201A and vision sensor 2201B may be provided at the ingress of the fill line 2202, and a vision sensor 2203 may be provided at the egress of the fill line.

In the system depicted in FIG. 22, different SKUs may be used to correspond to different types of packaging. For instance, a hair dye may be dispensed into a plastic bottle for one SKU, or a hair dye may be dispensed into a higher quality glass bottle for another SKU. This may be based on customer preference, or it may be based on the type of hair dye that is being created. Additionally, a batch hair dye that used in the system may use a different type of container than a personalized hair dye ordered by an individual customer.

Therefore, the robotic arm is programmed to provide flexibility to use a variety of SKU-specific containers in the same dispensing/fill line without requiring separate fill lines, manual or human intervention, or predetermined schedules for handling the different SKUs in different sessions. The robotic arm is preferably accompanied by a vision sensor to ensure that the correct packaging is being used on the fill line for each position in a sequence. Another vision sensor 2003 is used at the end of the fill line to make sure that the correct packaging was used in case there was a mistake at the ingress.

The flexible nature of the system shown in FIG. 22 provides the following benefit that it can combine batch formulation+personalized filling into one system. In other words, because of the ability to change the type of container (SKU) dynamically, batch orders and customized orders can be dispensed on the same fill line with minimal disruption.

Also, because of the independent, self-organizing connected stations in the system, the programming of the dispensing operations can be controlled so that the recipe for any of the bottles can be synchronized to the fill stations.

The flexible nature of the above-described system further achieves a full connected supply chain which allows integration of eCommerce directly to factory production.

Figure 23:
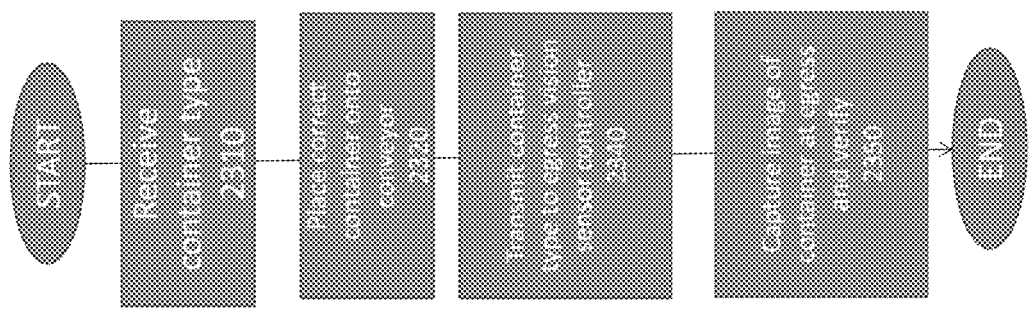
FIG. 23 shows a method performed by the system of FIG. 22

A method performed by the system of FIG. 22 is shown in FIG. 23. In step 2310, controller for the robotic arm receives a container type in the order in the sequence of containers to be dispensed by the fill station. In step 2320, the robotic arm is controlled to obtain the correct type of container based on the received container type and place the container on the assembly line. At step 2340, information of the received container type of transmitted to the vision sensor controller at the egress of the fill station. Then, at step 2350, the vision sensor captures an image of the container after it has been filled with the cosmetic product according to the recipe, and it verifies that the correct container was used using image recognition techniques as known in the art. If the incorrect container was used, then the container is flagged and it is not allowed to proceed to shipment.

While a vision sensor 2203 is shown at the egress of the system, alternatively, each container can have an embedded NFC tag, and the egress can have a NFC reader to verify the type of container.

Additionally, while verification of the correct container is described above. Additional verifications can be used at the egress of the fill station. For instance, using a color scanner, a correct shade of cosmetic product can be verified if such a scan is performed immediately before a lid is placed on the container.

Additionally, an optical character recognition scanner can be used at the egress to verify if the label includes correct information on the type of cosmetic product or customer information.

The hardware elements in order to achieve the processing device may be realized by various circuitry elements, known to those skilled in the art. For example, CPU 3500 may be a Xenon or Core processor from Intel of America or an Opteron processor from AMD of America, or may be other processor types that would be recognized by one of ordinary skill in the art. Alternatively, the CPU 3500 may be implemented on an FPGA, ASIC, PLD or using discrete logic circuits, as one of ordinary skill in the art would recognize. Further, CPU 3500 may be implemented as multiple processors cooperatively working in parallel to perform the instructions of the inventive processes described above.

The processing device also includes a network controller 3506, such as an Intel Ethernet PRO network interface card from Intel Corporation of America, for interfacing with network 3530. As can be appreciated, the network 3530 can be a public network, such as the Internet, or a private network such as an LAN or WAN network, or any combination thereof and can also include PSTN or ISDN sub-networks. The network 3530 can also be wired, such as an Ethernet network, or can be wireless such as a cellular network including EDGE, 3G and 4G wireless cellular systems. The wireless network can also be WiFi, Bluetooth, or any other wireless form of communication that is known.

The processing device further includes a display controller 3508, such as a NVIDIA GeForce GTX or Quadro graphics adaptor from NVIDIA Corporation of America for interfacing with display 3510, such as a Hewlett Packard HPL2445w LCD monitor. A general purpose I/O interface 3512 interfaces with a keyboard and/or mouse 3514 as well as a touch screen panel 3516 on or separate from display 3510. General purpose I/O interface also connects to a variety of peripherals 3518 including printers and scanners, such as an OfficeJet or DeskJet from Hewlett Packard.

A sound controller 3520 is also provided in the processing device, such as Sound Blaster 35-Fi Titanium from Creative, to interface with speakers/microphone 3522 thereby providing sounds and/or music.

The general purpose storage controller 3524 connects the storage medium disk 3504 with communication bus 3526, which may be an ISA, EISA, VESA, PCI, or similar, for interconnecting all of the components of the processing device. A description of the general features and functionality of the display 3510, keyboard and/or mouse 3514, as well as the display controller 3508, storage controller 3524, network controller 3506, sound controller 3520, and general purpose I/O interface 3512 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset.

The functions and features described herein may also be executed by various distributed components of a system. For example, one or more processors may execute these system functions, wherein the processors are distributed across multiple components communicating in a network. The distributed components may include one or more client and server machines, which may share processing, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

A processing device used by a user (customer) is configured to upload data regarding the user to an external system or server (such as a cloud-based system). The processing device can also provide an option to keep the user data anonymous.

Furthermore, the circuitry of the processing device may be configured to actuate a discovery protocol that allows the processing device and a system to identify each other and to negotiate one or more pre-shared keys, which further allows the system and the processing device to exchanged encrypted and anonymized information. The discovery protocol may further allow the client device and system to exchange treatment regimen information.

The above-described hardware description is a non-limiting example of corresponding structure for performing the functionality described herein.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The invention claimed is:

1. A system for dispensing a cosmetic container, comprising:
 a conveyer belt configured to transport a receiver container along a fill line;
 a robotic arm disposed at an ingress position of the fill line;
 a sensor disposed at an egress position of the fill line;
 circuitry configured to
 receive an order having a container type;
 control the robotic arm to obtain a container corresponding to the container type and place it a predetermined position on the conveyor belt at an entrance of the fill line;
 transmit information of a sequence position of the container and the container type to the sensor;
 verify that the correct container is at the sequence position at the egress of the fill line after the container has been filed with a cosmetic product,
 wherein the robotic arm has access to a plurality of container types that include a glass bottle and a plastic bottle.

2. The system according to claim 1, wherein the sensor disposed at the egress position is a vision sensor.

3. The system according to claim 1, wherein the container obtained by the robotic arm has an embedded radiofrequency tag that stores information regarding the container type, and the sensor disposed at the egress position is configured to read the stored information from the radiofrequency tag.

4. The system according to claim 1, wherein the plurality of container types correspond to different stock keeping units (SKUs).

* * * * *